(12) United States Patent
Hackman et al.

(10) Patent No.: US 10,489,792 B2
(45) Date of Patent: Nov. 26, 2019

(54) MAINTAINING QUALITY OF CUSTOMER SUPPORT MESSAGES

(71) Applicant: ASAPP, INC., New York, NY (US)

(72) Inventors: Joseph Ellsworth Hackman, Rego Park, NY (US); Shawn Henry, Longmont, CO (US); Alan Nicolas Hampton, San Francisco, CA (US); Tao Lei, Jersey City, NJ (US)

(73) Assignee: ASAPP, INC., New York, NY (US)

( * ) Notice: Subject to any disclaimer, the term of this patent is extended or adjusted under 35 U.S.C. 154(b) by 0 days.

(21) Appl. No.: 15/863,225

(22) Filed: Jan. 5, 2018

(65) Prior Publication Data
US 2019/0213601 A1  Jul. 11, 2019

(51) Int. Cl.
*G06F 17/27* (2006.01)
*G06Q 30/00* (2012.01)
*G06N 3/04* (2006.01)

(52) U.S. Cl.
CPC .............. *G06Q 30/016* (2013.01); *G06N 3/04* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795

(Continued)

(56) References Cited

U.S. PATENT DOCUMENTS

| 5,195,034 A | 3/1993 | Garneau et al. |
| 5,227,971 A | 7/1993 | Nakajima et al. |

(Continued)

FOREIGN PATENT DOCUMENTS

| EP | 3482359 A1 | 5/2019 |
| WO | 2018009231 A1 | 1/2018 |

(Continued)

OTHER PUBLICATIONS

U.S. Appl. No. 15/789,241, "U.S. Appl. No. 15/789,241, filed Oct. 20, 2017", 51 pages.

(Continued)

*Primary Examiner* — Lamont M Spooner
(74) *Attorney, Agent, or Firm* — GTC Law Group PC & Affiliates

(57) ABSTRACT

A company may desire to maintain a quality level for messages sent by customer service representatives to customers. The company may receive a message input by a customer service representative, modify the message with one or more neural networks, and transmit the modified message to a customer. To modify a message, an input vector may be created for each word of the message where the input vector is created using a word embedding of the word and a feature vector that represents the characters of the word. The input vectors for the words of the message may be sequentially processed with an encoding neural network to compute a message encoding vector that represents the message. The message encoding vector may then be processed by a decoding neural network to sequentially generate the words of a modified message. The modified message may then be transmitted to the customer.

21 Claims, 14 Drawing Sheets

(58) Field of Classification Search
USPC .................................................. 704/1, 9, 10
See application file for complete search history.

(56) References Cited

U.S. PATENT DOCUMENTS

| | | | |
|---|---|---|---|
| 5,369,575 | A | 11/1994 | Lamberti et al. |
| 6,173,279 | B1 | 1/2001 | Levin et al. |
| 6,177,932 | B1 | 1/2001 | Galdes et al. |
| 6,327,363 | B1 | 12/2001 | Henderson et al. |
| 6,381,645 | B1 | 4/2002 | Sassin et al. |
| 6,453,292 | B2 | 9/2002 | Ramaswamy et al. |
| 6,915,254 | B1 | 7/2005 | Heinze et al. |
| 6,981,040 | B1 | 12/2005 | Konig et al. |
| 7,257,564 | B2* | 8/2007 | Loughmiller ........ G06Q 10/107 |
| | | | 706/10 |
| 7,603,330 | B2 | 10/2009 | Gupta et al. |
| 7,644,057 | B2 | 1/2010 | Nelken et al. |
| 8,024,196 | B1 | 9/2011 | Wodtke et al. |
| 8,054,951 | B1 | 11/2011 | Winslow et al. |
| 8,156,138 | B2 | 4/2012 | Kohn et al. |
| 8,271,403 | B2 | 9/2012 | Rieck et al. |
| 8,494,152 | B1 | 7/2013 | Roberts et al. |
| 8,577,671 | B1 | 11/2013 | Barve et al. |
| 8,626,509 | B2 | 1/2014 | Roy et al. |
| 9,043,197 | B1 | 5/2015 | Pasca et al. |
| 9,336,269 | B1 | 5/2016 | Smith et al. |
| 9,591,136 | B1 | 3/2017 | Garcia et al. |
| 9,602,987 | B1* | 3/2017 | Wittig ..................... H04L 51/12 |
| 9,715,496 | B1* | 7/2017 | Sapoznik ............. G06F 17/279 |
| 9,723,151 | B2 | 8/2017 | McGann et al. |
| 9,727,925 | B2* | 8/2017 | Subramanian ......... G06Q 50/01 |
| 9,742,916 | B1* | 8/2017 | Christopher ........ H04M 3/5183 |
| 9,761,222 | B1* | 9/2017 | Scarasso ................. G10L 15/07 |
| 9,762,733 | B1 | 9/2017 | Ramanujaiaha et al. |
| 9,805,371 | B1* | 10/2017 | Sapoznik ............. G06Q 30/016 |
| 9,807,037 | B1* | 10/2017 | Sapoznik ............. H04L 51/02 |
| 9,875,440 | B1* | 1/2018 | Commons ................ G06N 3/08 |
| 9,892,414 | B1* | 2/2018 | Henry .................... G06Q 30/01 |
| 10,049,663 | B2 | 8/2018 | Orr et al. |
| 10,067,938 | B2 | 9/2018 | Bellegarda |
| 10,083,451 | B2 | 9/2018 | Sehrawat et al. |
| 10,083,690 | B2 | 9/2018 | Giuli et al. |
| 10,089,072 | B2 | 10/2018 | Piersol et al. |
| 10,097,690 | B1 | 10/2018 | Henry |
| 10,109,275 | B2 | 10/2018 | Henry |
| 10,127,908 | B1 | 11/2018 | Deller et al. |
| 10,169,315 | B1 | 1/2019 | Heckel et al. |
| 10,210,244 | B1 | 2/2019 | Branavan et al. |
| 2003/0033288 | A1 | 2/2003 | Shanahan et al. |
| 2003/0033347 | A1* | 2/2003 | Bolle ................ G06F 17/30253 |
| | | | 718/107 |
| 2003/0103621 | A1 | 6/2003 | Brown et al. |
| 2004/0003283 | A1* | 1/2004 | Goodman ............. G06Q 10/107 |
| | | | 726/30 |
| 2004/0254904 | A1 | 12/2004 | Nelken et al. |
| 2005/0076084 | A1* | 4/2005 | Loughmiller ........ G06Q 10/107 |
| | | | 709/206 |
| 2005/0105712 | A1 | 5/2005 | Williams et al. |
| 2005/0228790 | A1 | 10/2005 | Ronnewinkel et al. |
| 2006/0112127 | A1 | 5/2006 | Krause et al. |
| 2006/0173776 | A1 | 8/2006 | Shalley et al. |
| 2007/0094217 | A1 | 4/2007 | Ronnewinkel et al. |
| 2007/0100618 | A1 | 5/2007 | Lee et al. |
| 2007/0121899 | A1 | 5/2007 | Galvin |
| 2007/0168448 | A1 | 7/2007 | Garbow et al. |
| 2008/0091435 | A1 | 4/2008 | Strope et al. |
| 2008/0112620 | A1 | 5/2008 | Jiang |
| 2008/0168070 | A1 | 7/2008 | Naphade et al. |
| 2008/0168135 | A1 | 7/2008 | Redlich et al. |
| 2011/0066634 | A1 | 3/2011 | Phillips et al. |
| 2011/0082825 | A1 | 4/2011 | Sathish et al. |
| 2011/0093414 | A1 | 4/2011 | Xu et al. |
| 2011/0173346 | A1* | 7/2011 | Neben ................... G06Q 10/00 |
| | | | 709/246 |
| 2011/0270771 | A1 | 11/2011 | Coursimault et al. |
| 2011/0286596 | A1 | 11/2011 | Gressel et al. |
| 2011/0314012 | A1 | 12/2011 | Kenthapadi et al. |
| 2012/0005515 | A1 | 1/2012 | Reddi et al. |
| 2012/0053945 | A1 | 3/2012 | Gupta et al. |
| 2012/0102130 | A1* | 4/2012 | Guyot ..................... H04L 51/12 |
| | | | 709/206 |
| 2012/0266258 | A1 | 10/2012 | Tuchman et al. |
| 2013/0143587 | A1 | 6/2013 | Williams et al. |
| 2013/0144605 | A1 | 6/2013 | Brager et al. |
| 2013/0166485 | A1 | 6/2013 | Hoffmann et al. |
| 2013/0173604 | A1 | 7/2013 | Li et al. |
| 2013/0317808 | A1 | 11/2013 | Kruel et al. |
| 2014/0075004 | A1 | 3/2014 | Van Dusen et al. |
| 2014/0079195 | A1 | 3/2014 | Srivastava et al. |
| 2014/0180788 | A1* | 6/2014 | George ............. G06Q 30/0269 |
| | | | 705/14.41 |
| 2014/0278379 | A1 | 9/2014 | Coccaro et al. |
| 2014/0282138 | A1 | 9/2014 | Hopton et al. |
| 2014/0297268 | A1 | 10/2014 | Govrin et al. |
| 2014/0297281 | A1 | 10/2014 | Togawa et al. |
| 2014/0317030 | A1 | 10/2014 | Shen et al. |
| 2014/0330818 | A1 | 11/2014 | Raina et al. |
| 2014/0365209 | A1 | 12/2014 | Evermann |
| 2015/0006143 | A1 | 1/2015 | Skiba et al. |
| 2015/0032724 | A1 | 1/2015 | Thirugnanasundaram et al. |
| 2015/0052002 | A1 | 2/2015 | Welch et al. |
| 2015/0073798 | A1 | 3/2015 | Karov et al. |
| 2015/0142704 | A1 | 5/2015 | London |
| 2015/0149177 | A1 | 5/2015 | Kalns et al. |
| 2015/0154285 | A1 | 6/2015 | Saarinen et al. |
| 2015/0178390 | A1 | 6/2015 | Torras |
| 2015/0215624 | A1 | 7/2015 | Wei |
| 2015/0220833 | A1 | 8/2015 | Le |
| 2015/0220995 | A1* | 8/2015 | Guyot ................ G06Q 30/0269 |
| | | | 705/14.66 |
| 2015/0228275 | A1 | 8/2015 | Watanabe et al. |
| 2015/0242385 | A1 | 8/2015 | Bao et al. |
| 2015/0310377 | A1 | 10/2015 | Duval et al. |
| 2015/0340032 | A1* | 11/2015 | Gruenstein ............. G10L 15/16 |
| | | | 704/232 |
| 2015/0363393 | A1 | 12/2015 | Williams et al. |
| 2015/0365387 | A1 | 12/2015 | Good |
| 2016/0019816 | A1* | 1/2016 | Parry ..................... G09B 19/06 |
| | | | 704/2 |
| 2016/0063067 | A1 | 3/2016 | Maitra et al. |
| 2016/0078456 | A1 | 3/2016 | Chakraborty et al. |
| 2016/0092688 | A1 | 3/2016 | Wolrich et al. |
| 2016/0163311 | A1 | 6/2016 | Crook et al. |
| 2016/0163314 | A1 | 6/2016 | Fujii et al. |
| 2016/0180151 | A1 | 6/2016 | Philbin et al. |
| 2016/0180838 | A1 | 6/2016 | Parada San Martin et al. |
| 2016/0182672 | A1 | 6/2016 | Kuperman et al. |
| 2016/0239846 | A1 | 8/2016 | Arvapally et al. |
| 2016/0247068 | A1 | 8/2016 | Lin |
| 2016/0255034 | A1 | 9/2016 | Yuan |
| 2016/0323398 | A1* | 11/2016 | Guo .................... G06Q 10/06311 |
| 2016/0328388 | A1 | 11/2016 | Cao et al. |
| 2016/0364522 | A1 | 12/2016 | Frey et al. |
| 2017/0011279 | A1 | 1/2017 | Soldevila et al. |
| 2017/0013073 | A1 | 1/2017 | Mendez et al. |
| 2017/0091320 | A1 | 3/2017 | Psota et al. |
| 2017/0103324 | A1* | 4/2017 | Weston ..................... G06N 5/02 |
| 2017/0116982 | A1 | 4/2017 | Gelfenbeyn et al. |
| 2017/0147682 | A1* | 5/2017 | Alaqeeli ............. G06F 17/30684 |
| 2017/0148073 | A1 | 5/2017 | Nomula et al. |
| 2017/0200077 | A1* | 7/2017 | Weston .................... G06N 3/063 |
| 2017/0213138 | A1* | 7/2017 | Bojja ....................... G06N 5/04 |
| 2017/0308523 | A1* | 10/2017 | Wang ................... G06F 17/279 |
| 2017/0323016 | A1* | 11/2017 | Feng .................. G06F 17/30828 |
| 2018/0005112 | A1* | 1/2018 | Iso-Sipila ................ G06N 3/04 |
| 2018/0012231 | A1* | 1/2018 | Sapoznik ............. G06Q 30/016 |
| 2018/0012232 | A1 | 1/2018 | Sehrawat et al. |
| 2018/0013699 | A1* | 1/2018 | Sapoznik ............... H04L 51/02 |
| 2018/0018562 | A1* | 1/2018 | Jung ....................... G06N 3/08 |
| 2018/0032755 | A1 | 2/2018 | Odinak |
| 2018/0052664 | A1 | 2/2018 | Zhang et al. |
| 2018/0068233 | A1* | 3/2018 | Miranda ............... G06N 99/005 |
| 2018/0121738 | A1 | 5/2018 | Womack et al. |
| 2018/0131645 | A1* | 5/2018 | Magliozzi ............... H04L 51/02 |

(56) References Cited

U.S. PATENT DOCUMENTS

| | | | |
|---|---|---|---|
| 2018/0143965 A1* | 5/2018 | Willson | G06F 17/276 |
| 2018/0174037 A1 | 6/2018 | Henry | |
| 2018/0174579 A1 | 6/2018 | Henry | |
| 2018/0181807 A1 | 6/2018 | Yankov | |
| 2018/0203848 A1* | 7/2018 | Perez | G10L 25/30 |
| 2018/0232434 A1 | 8/2018 | Geyik et al. | |
| 2018/0239830 A1 | 8/2018 | Dialani et al. | |
| 2018/0253734 A1 | 9/2018 | Henry | |
| 2018/0329886 A1* | 11/2018 | Li | G06F 17/2785 |
| 2018/0365702 A1 | 12/2018 | Sehrawat et al. | |
| 2018/0376002 A1 | 12/2018 | Abraham | |
| 2019/0019197 A1 | 1/2019 | Roberts et al. | |
| 2019/0019503 A1 | 1/2019 | Henry | |
| 2019/0180288 A1 | 6/2019 | Shaev et al. | |
| 2019/0182383 A1 | 6/2019 | Shaev et al. | |
| 2019/0213601 A1 | 7/2019 | Hackman et al. | |

FOREIGN PATENT DOCUMENTS

| | | | |
|---|---|---|---|
| WO | 2018009432 A1 | 1/2018 | |
| WO | 2018160492 A1 | 9/2018 | |
| WO | 2019113409 A1 | 6/2019 | |
| WO | 2019113409 A8 | 7/2019 | |

OTHER PUBLICATIONS

Bahdanau, et al., "Neural Machine Translation by Jointly Learning to Align and Translate", CoRR abs/1409.0473, http://arxiv.org/abs/1409.0473, May 19, 2016, 15 pages.

Chandar, et al., "Correlational Neural Networks", CoRR abs/1504.07225, http://arxiv.org/abs/1504.07225, Oct. 12, 2015, 27 pages.

Cheng, et al., "Semi-Supervised Learning for Neural Machine Translation", CoRR abs/1606.04596, http://arxiv.org/abs/1606.04596, Dec. 10, 2016, 10 pages.

Goodfellow, et al., "Generative Adversarial Nets", Advances in Neural Information Processing Systems 27 (NIPS 2014), https://papers.nips.cc/paper/5423-generative-adversarial-nets.pdf, 2014, pp. 2672-2680.

Kim, et al., "Character-Aware Neural Language Models", CoRR abs/1508.06615, http://arxiv.org/abs/1508.06615, 2015, 9 pages.

Lample, et al., "Unsupervised Machine Translation Using Monolingual Corpora Only", CoRR abs/1711 .00043, http://arxiv.org/abs/1711.00043, Oct. 31, 2017, 12 pages.

See, et al., "Get to the Point: Summarization with Pointer-Generator Networks", CoRR abs/1704.04368, http://arxiv.org/abs/1704.04368, Apr. 25, 2017, 20 pages.

Shen, et al., "Style Transfer from Non-Parallel Text by Cross-Alignment", CoRR abs/1705.09655, http://arxiv.org/abs/1705.09655, Nov. 6, 2017, 12 pages.

Sutskever, et al., "Sequence to Sequence Learning with Neural Networks", CoRR abs/1409.3215, http://arxiv.org/abs/1409.3215, 2014, 9 pages.

Xiao, et al., "Efficient Character-level Document Classification by Combining Convolution and Recurrent Layers", CoRR abs/1602.00367, https://arxiv.org/pdf/1602.00367.pdf, Feb. 1, 2016, 10 pages.

Chen, et al., "Compressing Neural Networks with the Flashing Trick", arXiv:1504.04788v1, https://arxiv.org/pdf/1504.04788.pdf (accessed on Nov. 26, 2018), Apr. 19, 2015, 10 pages.

De La Briandais, "File Searching Using Variable Length Keys", Proceedings of the 1959 Western Joint Computer Conference, https://pdfs.semanticscholar.org/3ce3/f4cc1c91d03850ed84ef96a08498e018d18f.pdf, 1959, pp. 295-298.

Vincent, et al., "Extracting and Composing Robust Features with Denoising Autoencoders", Proceedings of the 25th International Conference on Machine Learning, Helsinki, Finland, http://www.cs.toronto.edu/~larocheh/publications/icml-2008-denoising-autoencoders.pdf (accessed on Nov. 26, 2018), 2008, 8 pages.

Vincent, et al., "Stacked Denoising Autoencoders: Learning Useful Representations in a Deep Network with a Local Denoising Criterion", Journal of Machine Learning Research 11, http://www.jmlr.org/papers/volume11/vincent10a/vincent10a.pdf, published Dec. 2010, pp. 3371-3408.

"Scikit-learn: Machine Learning in Python", scikit-learn 0.17.1 documentation, http://scikit-learn.org/stable/ (accessed on Sep. 20, 2016), 3 pages.

"Using algorithms for advanced customer care", Nokia Strategic white paper, https://resources.ext.nokia.com/asset/200614 (accessed Jul. 26, 2017), 2017, 11 pages.

Al-Rfou, Rami et al., "Conversational Contextual Cues: The Case of Personalization and History for Response Ranking", CoRR abs/1606.00372, http://arxiv.org/abs/1606.00372, 2016, 10 pages.

Bengio, Yoshua et al., "A Neural Probabilistic Language Model", Journal of Machine Learning Research, vol. 3 accessed at http://www.jmlr.org/papers/volume3/bengio03a/bengio03a.pdf, 2003 (accessed on Jan. 3, 2017), pp. 1137-1155.

Berger, Mark J. , "Large Scale Multi-label Text Classification with Semantic Word Vectors", published 2015 (Year: 2015), Department of Computer Science, Stanford University, Stanford, CA 94305, mjberger@stanford.edu, 2015, pp. 1-8.

Black, William J. et al., "Facile: Description of the NE System Used for MUC-7", Proceedings of the 7th Message Understanding Conference, https://www-nlpir.nist.gov/related_projects/muc/proceedings/muc_7_proceedings/facile_muc7.pdf, 1998, 10 pages.

Blei, David M. et al., "Latent Dirichlet Allocation", Journal of Machine Learning Research, vol. 3, 2003, pp. 993-1022.

Brown, Peter F. et al., "Class-Based n-gram Models of Natural Language", Computational Linguistics, vol. 18, No. 4, accessed at http://aclweb.org/anthology/J/J92/J92-4003.pdf, 1992, pp. 467-479 (accessed on Jan. 3, 2017).

Carrier, Pierre L. et al., "LSTM Networks for Sentiment Analysis", http://deeplearning.net/tutorial/lstm.html, accessed on Sep. 20, 2016, 5 pages.

Chen, Yun-Nung et al., "An empirical investigation of sparse log-linear models for improved dialogue act classification", 2013 IEEE International Conference on Acoustics. Speech and Signal Processing. IEEE., 2013, 6 pages.

Chen, Yun-Nung , "An empirical investigation of sparse log-linear models for improved dialogue act classification.", 2013 IEEE International Conference on Acoustics, Speech and Signal Processing. IEEE, 2013, pp. 1-6.

Collados, Jose C. , "On the contribution of neural networks and word embeddings in Natural Language Processing", published at Medium.com, Jan. 2018. (Year: 2018), http://www.josecamachocollados.com, Jan. 2018, pp. 1-7.

Courbariaux, Matthieu et al., "BinaryConnect: Training Deep Neural Networks with binary weights during propagations", CoRR, accessed at https://arxiv.org/pdf/1511.00363v3.pdf, 2015 (Jan. 3, 2017), 9 pages.

Deerwester, Scott et al., "Improving Information Retrieval with Latent Semantic Indexing", Proceedings of the 51st ASIS Annual Meeting (ASIS '88), vol. 25, Oct. 1988, pp. 36-40.

Deerwester, Scott et al., "Indexing by Latent Semantic Analysis", Journal of the Association for Information Science and Technology, vol. 41, iss. 6, Sep. 1990, pp. 391-407.

Frome, Andrea et al., "Large-scale Privacy Protection in Google Street View", 2009 IEEE 12th International Conference on Computer Vision https://pdfs.semanticscholar.org/e645/6ac0e57396f222689dc71a310c2779a31488.pdf, Sep. 29-Oct. 2, 2009, 8 pages.

Gong, Yunchao et al., "Iterative Quantization: A Procrustean Approach to Learning Binary Codes", CVPR 2011, accessed at http://www.cs.unc.edu/~lazebnik/publications/cvpr11_small_code.pdf, 2011 (accessed on Jan. 3, 2017), pp. 817-824.

Gray, R. , "Vector quantization", IEEE ASSP Magazine, vol. 1, iss. 2 https://ieeexplore.ieee.org/document/1162229/ (abstract only), Apr. 1984, pp. 4-29.

Henderson, Matthew et al., "Efficient Natural Language Response Suggestion for Smart Reply", arXiv:1705.00652v1, https://arxiv.org/pdf/1705.00652.pdf, May 1, 2017, 15 pages.

Hochreiter, Sepp et al., "Long Short-Term Memory", Neural Computation, vol. 9, iss. 8, 1997, pp. 1735-1780.

(56) References Cited

OTHER PUBLICATIONS

Hochreitner, Sepp et al., "Long Short-Term Memory", Neural Computation, vol. 9, Iss. 8, accessed at http://deeplearning.cs.cmu.edu/pdfs/Hochreiter97_lstm.pdf, 1997 (accessed on Jan. 3, 2017), pp. 1735-1780.
Huang, Zhiheng et al., "Bidirectional LSTM-CRF Models for Sequence Tagging", arXiv:1508.01991v1, https://arxiv.org/pdf/1508.01991.pdf, Aug. 9, 2015, 10 pages.
Iyyer, Mohit et al., "Deep Unordered Composition Rivals Syntactic Methods for Text Classification", Association for Computational Linguistics (ACL), http://cs.umd.edu~miyyer/pubs/2015_acl_dan.pdf, 2015, 11 pages.
Ji, Zongcheng et al., "An Information Retrieval Approach to Short Text Conversation", CoRR, accessed at https://arxiv.org/pdf/1408.6988v1.pdf, Aug. 29, 2014 (accessed on Jan. 3, 2017), 21 pages.
Karpathy, Andrej, "The Unreasonable Effectiveness of Recurrent Neural Networks", http://karpathy.github.io/2015/05/21/rnn-effectiveness/, (accessed on Sep. 20, 2016), May 21, 2015, 42 pages.
Kim, Yoon, "Convolutional Neural Networks for Sentence Classification", Proceedings of the 2014 Conference on Empirical Methods in Natural Language Processing (EMNLP), Oct. 25-29, 2014, Doha, Qatar, 2014, pp. 1746-1751.
Kiros, Ryan et al., "Skip-Thought Vectors", Proceedings of the 28th International Conference on Neural Information Processing Systems, vol. 2., 2015, pp. 3294-3302.
Lafferty, John et al., "Conditional Random Fields: Probabilistic Models for Segmenting and Labeling Sequence Data", https://repository.upenn.edu/cgi/viewcontent.cgi?article=1162&context=cis_papers, The definitive version was published in Proceedings of the 18th International Conference on Machine Learning 2001 (ICML 2001), pp. 282-289, Jun. 2001, 10 pages.
Lai, Hanjiang et al., "Simultaneous Feature Learning and Hash Coding with Deep Neural Networks", CoRR, accessed at http://www.cv-foundation.org/openaccess/content_cvpr_2015/papers/Lai_Simultaneous_Feature_Learning_2015_CVPR_paper.pdf, 2015 (accessed Jan. 3, 2017), pp. 3270-3278.
Lai, Siwei et al., "Recurrent Convolutional Neural Networks for Text Classification", AAAI'15 Proceedings of the Twenty-Ninth AAAI Conference on Artificial Intelligence, 2015, pp. 2267-2273.
Larochelle, Hugo et al., "A Neural Autoregressive Topic Model", Advances in Neural Information Processing Systems 25, Editors: F. Pereira and C. J. C. Burges and L. Bottou and K. Q. Weinberger, Published by Curran Associates, Inc., 2012, pp. 2708-2716.
Le, Quoc et al., "Distributed Representations of Sentences and Documents", Proceedings of the 31st International Conference on Machine Learning, W&Cp vol. 32, Beijing, China, 2014, 9 pages.
Lee, Cheongjae et al., "Robust Dialog Management with N-best Hypotheses Using Dialog Examples and Agenda", Proceedings of ACL-08: HLT, Columbus, Ohio, Jun. 2008, pp. 630-637.
Levy, Omer et al., "Neural Word Embedding as Implicit Matrix Factorization", Advances in Neural Information Processing Systems 27: Annual Conference on Neural Information Processing Systems 2014, Dec. 8-13, 2014, Montreal, Quebec, Canada, http://papers.nips.cc/paper/5477-neural-word-embedding-as-implicit-matrix-factorization.pdf, 2014, pp. 2177-2185.
Li, Jiwei et al., "A Hierarchical Neural Autoencoder for Paragraphs and Documents", Proceedings of the 53rd Annual Meeting of the Association for Computational Linguistics and the 7th International Joint Conference on Natural Language Processing, Beijing, China, http://web.stanford.edu/~jurafsky/pubs/P15-1107.pdf, Jul. 26-31, 2015 (accessed on Jan. 3, 2017), pp.1106-1115.
Lin, Hui et al., "Multi-document Summarization via Budgeted Maximization of Submodular Functions", In Proceed. of Human Language Technologies: The Conf. of the North American Chapter of the Association for Computational Linguistics (NAACL-HLT), (accessed Nov. 26, 2018 at https://pdfs.semanticscholar.org/6286/a97ae2d9cff9b69f14d6cee3c611a1a63379.pdf), 2010, pp. 912-920.
Lin, Zhouhan et al., "A Structured Self-Attentive Sentence Embedding", arXiv:1703.03130v1, https://arxiv.org/pdf/1703.03130.pdf (accessed Jul. 13, 2017), Mar. 9, 2017, 15 pages.
Logeswaran, Lajanugen et al., "An Efficient Framework for Learning Sentence Representations", International Conference on Learning Representations, https://openreview.net/pdf?id=rJvJXZbOW, 2018, 16 pages.
Logeswaran, Lajanugen et al., "An efficient framework for learning sentence representations", ICLR 2018 Conference Blind Submission, https://openreview.net/pdf?id=rJvJXZbOW (accessed Nov. 26, 2018), Feb. 15, 2018, 16 pages.
Miao, Yishu et al., "Neural Variational Inference for Text Processing", CoRR abs/1511.06038, http://arxiv.org/abs/1511.06038, 2015, 15 pages.
Mikolov, Tomas et al., "Distributed Representations of Words and Phrases and their Compositionality", CoRR abs/1310.4546, http://arxiv.org/abs/1310.4546, 2013, 9 pages.
Mikolov, Tomas et al., "Distributed Representations of Words and Phrases and their Compositionality", CoRR, accessed at https://papers.nips.cc/paper/5021-distributed-representations-of-words-and-phrases-and-their-compositionality.pdf, 2013 (accessed on Jan. 3, 2017), 9 pages.
Mikolov, Tomas et al., "Recurrent neural network based language model", Interspeech 2010, Sep. 26-30, 2010, Makuhari, Chiba, Japan, 2010, pp. 1045-1048.
Mikolov, Tomas et al., "Recurrent neural network based language model", INTERSPEECH 2010, Makuhari, Chiba, Japan, accessed at http://www.fit.vutbr.cz/research/groups/speech/publi/2010/mikolov_interspeech2010_IS100722.pdf, Sep. 26-30, 2010 (accessed on Jan 3, 2017), pp. 1045-1048.
Pagliardini, Matteo et al., "Unsupervised Learning of Sentence Embeddings using Compositional n-Gram Features", CoRR abs/1703.02507, http://arxiv.org/abs/1703.02507, Jul. 10, 2017, 11 pages.
PCT/US18/19731, "International Application Serial No. PCT/US18/19731, filed Feb. 26, 2018", 38 pages.
PCT/US2016/049896, "Application Serial No. PCT/US2016/049896, International Search Report and the Written Opinion dated May 19, 2017", 14 pages.
PCT/US2016/049896, "International Application Serial No. PCT/US2016/049896, International Preliminary Report on Patentability dated Jan. 17, 2019", ASAPP, Inc., 9 pages.
PCT/US2017/040205, "Application Serial No. PCT/US2017/040205, International Search Report and the Written Opinion dated Sep. 15, 2017", 11 pages.
PCT/US2017/040205, "International Application Serial No. PCT/US2017/040205, International Preliminary Report on Patentability dated Jan. 17, 2019", ASAPP, Inc., 9 pages.
PCT/US2019/014569, "International Application Serial No. PCT/US2019/014569, International Search Report and Written Opinion dated Mar. 4, 2019", ASAPP, Inc., 13 pages.
Pennington, Jeffrey et al., "GloVe: Global Vectors forWord Representation", Empirical Methods in Natural Language Processing (EMNLP), http://www.aclweb.org/anthology/D14-1162, (accessed on Nov. 26, 2018 from https://nlp.stanford.edu/pubs/glove.pdf), 2014, pp. 1532-1543.
Rush, Alexander M. et al., "Optimal Beam Search for Machine Translation", Proceedings of EMNLP 2013, Oct. 18-21, 2013, Seattle, Washington, USA, 2013, 12 pages.
Shi, Yangyang et al., "Contextual spoken language understanding using recurrent neural networks.", 2015 IEEE International Conference on Acoustics, Speech and Signal Processing (ICASSP). IEEE, 2015, pp. 5271-5275.
Tai, Kai S. et al., "Improved Semantic Representations From Tree-Structured Long Short-Term Memory Networks", CoRR, accessed at https://arxiv.org/pdf/1503.00075v3.pdf, 2015 (accessed on Jan. 3, 2017), 11 pages.
Vinyals, Oriol et al., "A Neural Conversational Model", CoRR abs/1506.05869, http://arxiv.org/abs/1506.05869, 2015, 8 pages.
Wang, Sida et al., "Baselines and Bigrams: Simple, Good Sentiment and Topic Classification", Proceedings of the 50th Annual Meeting of the Association for Computational Linguistics, Jeju, Republic of Korea, https://www.aclweb.org/anthology/P12-2018, Jul. 8-14, 2012, pp. 90-94.
Zhang, Xiang et al., "Character-level Convolutional Networks for Text Classification", CoRR abs/1509.01626, http://arxiv.org/abs/1509.01626, 2015, 9 pages.

(56) References Cited

OTHER PUBLICATIONS

Zhao, Han et al., "Self-Adaptive Hierarchical Sentence Model", CoRR abs/1504.05070, http://arxiv.org/abs/1504.05070, Apr. 27, 2015, 8 pages.
Cai, et al., "Hierarchical Document Categorization with Support Vector Machines", CIKM'04, Washington, DC, USA, https://info.cs.uab.edu/zhang/Spam-mining-papers/Hierarchical.Data.Classification.with.Support.Vector.Machines.pdf, Nov. 8-13, 2004, 10 pages.
Mühler, "Building a Node.js WebSocket Chat App with Socket.io and React", Tutorial to Socket.io with JavaScript, Feb. 22, 2018, 12 pages.
PCT/US2018/064404, "International Application Serial No. PCT/US2018/064404, International Search Report and Written Opinion dated Feb. 25, 2019", ASAPP, Inc., 9 pages.
Scott, et al., "Adapted Deep Embeddings: A Synthesis of Methods for k-Shot Inductive Transfer Learning", arXiv:1805.08402v4 [cs.LG], https://arxiv.org/pdf/1805.08402.pdf, Oct. 27, 2018, 12 pages.
Snell, et al., "Prototypical Networks for Few-shot Learning", arXiv:1703.05175v2 [cs.LG], https://arxiv.org/pdf/1703.05175.pdf, Jun. 19, 2017, 13 pages.
Ustinova, et al., "Learning Deep Embeddings with Histogram Loss", arXiv:1611.00822v1 [cs.CV], https://arxiv.org/pdf/1611.00822.pdf, Nov. 2, 2016, 9 pages.
Yu, et al., "Diverse Few-Shot Text Classification with Multiple Metrics", Proceedings of the 2018 Conference of the North American Chapter of the Association for Computational Linguistics: Human Language Technologies, vol. 1 (Long Papers), New Orleans, Louisiana, https://www.aclweb.org/anthology/N18-1109, Jun. 2018, pp. 1206-1215.

* cited by examiner

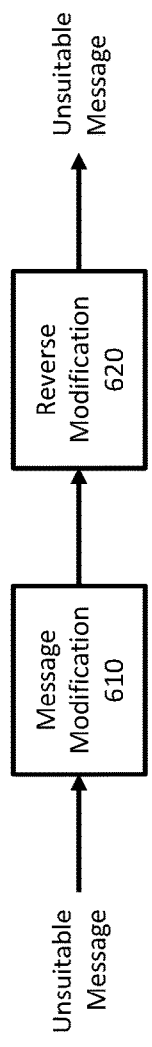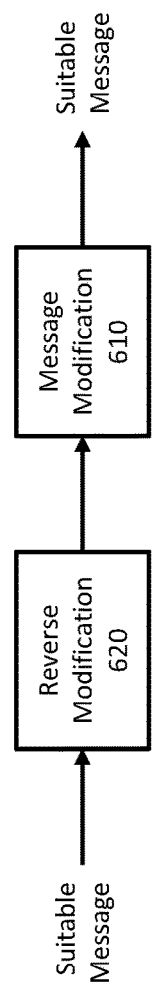

US 10,489,792 B2

MAINTAINING QUALITY OF CUSTOMER SUPPORT MESSAGES

FIELD OF THE INVENTION

The present invention relates to using semantic processing to improve customer support.

BACKGROUND

Companies need to efficiently interact with customers to provide services to their customers. For example, customers may need to obtain information about services of the company, may have a question about billing, or may need technical support from the company. Companies interact with customers in a variety of different ways. Companies may have a website and the customer may navigate the website to perform various actions. Companies may have an application ("app") that runs on a user device, such as a smart phone or a tablet, that provides similar services as a website. Companies may have a phone number that customers can call to obtain information via interactive voice response or to speak with a customer service representative. Companies may also respond to customers using various social media services, such as Facebook or Twitter.

A company may have customer service representatives who send messages to customers, and the company may want to ensure that the messages sent by customer service representatives to customers meet a desired quality level. For example, the company may want to ensure that proper grammar is used, that vulgar words or expletives are not used, and/or that the message has a style or tone that comports with a brand of the company. A company may want to use techniques to ensure that low quality messages are not sent to customers or to automatically modify messages to meet a desired quality level.

BRIEF DESCRIPTION OF THE FIGURES

The invention and the following detailed description of certain embodiments thereof may be understood by reference to the following figures:

FIG. 6A-6D are example systems for modifying a message using generative semi-supervised techniques.

DETAILED DESCRIPTION

Figure 1A:
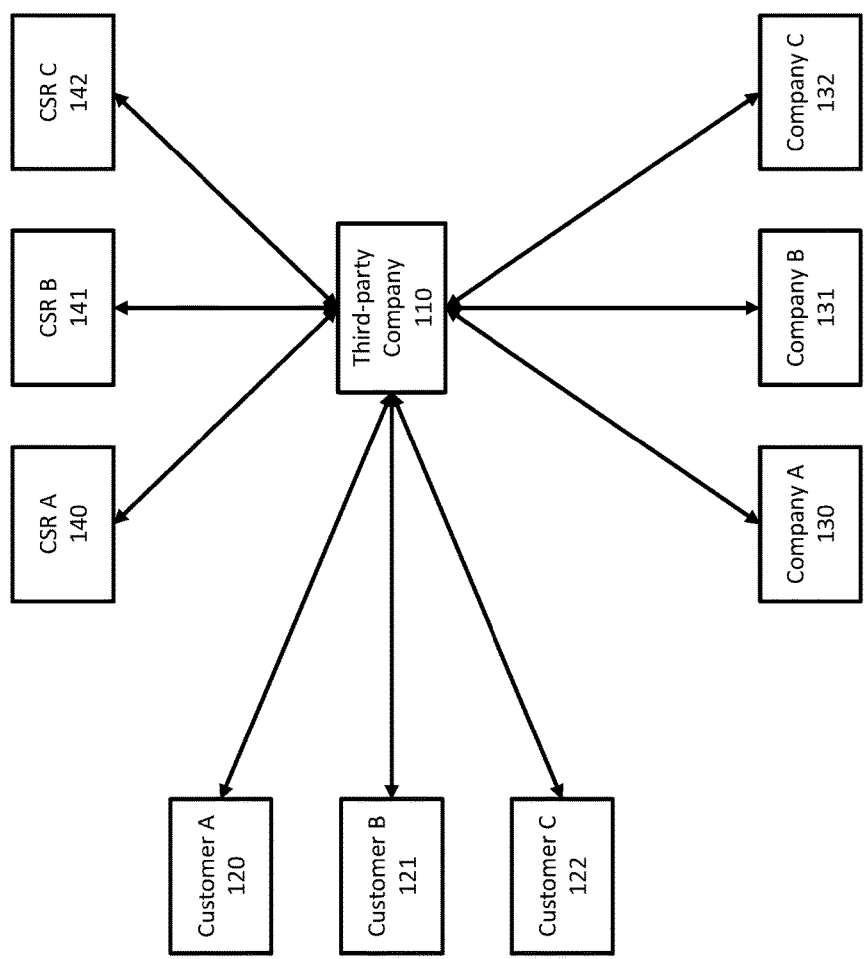
FIGS. 1A-1C are example systems by which a third-party company may provide customer support services to companies.

Described herein are techniques for using semantic processing to process messages entered by a first person for transmission to a second person to determine whether the entered message meets a desired quality level and/or to automatically modify the message to meet a desired quality level. Although the techniques described herein may be used for a wide variety of users and messages, for clarity of presentation, an example of a company providing a message in response to a customer service request of a customer will be used. The techniques described herein, however, are not limited to customers and companies, responses may be provided to requests from users who are not customers, and responses may be from any entity or person.

A company providing support to customers may hire customer service representatives (CSRs) to receive messages from customers and respond to the customers by sending messages back to the customers. To provide a good experience for customers, the company may want the messages sent by CSRs to meet a certain quality level. For example, the company may want to ensure that proper grammar is used, that vulgar words or expletives are not used, and/or that the message has a style or tone that comports with a brand of the company (e.g., a company selling luxury products may want a formal tone for messages sent to customers).

The term quality level (or quality score) as used in the present disclosure should be understood broadly, and includes at least: word choice (e.g., vulgarity, appropriate level of sophistication, pronounceability, utilization or avoidance of selected terms, utilization or avoidance of industry jargon, emotes, etc.); tone (e.g., words in certain contexts to be avoided or utilized, certain constructions such as imperative form or interrogative form); grammar (e.g., consistent verb tenses, subject-verb agreement, proper clause formation, etc.); or consistency (e.g., formulating messages across multiple CSRs or over time, to maintain similarity in interaction tones, word usage, etc.). It can be seen that quality level determinations are flexible, and can be adjusted based upon the context of the interaction, or the goals of the company. Certain messages that would be high quality in one context may be low quality in another context (e.g., a message that is acceptable in form and vocabulary, but inconsistent with other messages). A quality level or quality score may be implemented as a binary output (e.g., suitable or unsuitable quality, etc.), a discrete output (e.g., one of a selected group of quality categories, an integer value describing the quality level, etc.), or as a continuous or pseudo-continuous output (e.g., a quantitative parameter describing the quality level).

One of skill in the art, having the benefit of the disclosure herein and information ordinarily available for a contemplated system, can readily determine parameters for a quality level determination, including developing an appropriate training corpus, vocabulary, or tuning parameters for a contemplated system. Certain considerations for determining parameters for a quality level determination include at least: terms of art related to the company or customer; marketing considerations or preferences for the company; legal or liability considerations for certain terms or sentence constructions; or customer specific parameters such as education level, language of use, or cultural norms.

Ensuring that CSRs send only high quality messages may be challenging for a company. While the company may provide training to CSRs regarding sending of high quality messages, some CSRs may not perform well on occasions, a disgruntled CSR may intentionally send low quality or even rude messages to a customer, or an upset CSR or CSR speaking a secondary language may unintentionally send grammatically incorrect or otherwise low quality messages.

Even preventing the use of expletives may be challenging in that a disgruntled CSR may intentionally use misspellings to avoid word filters (e.g., @ssh0le). To prevent low quality messages from being sent to customers, a company may process some or all messages sent by CSRs. The processing may detect low quality messages and prevent them from being sent or may automatically modify messages to meet the desired quality standard.

The techniques described herein may use or be combined with any of the techniques described in U.S. Pat. No. 9,715,496 or U.S. patent application Ser. No. 15/789,241, each of which is incorporated herein by reference in their entireties for all purposes ("incorporated patents").

Figure 1B:
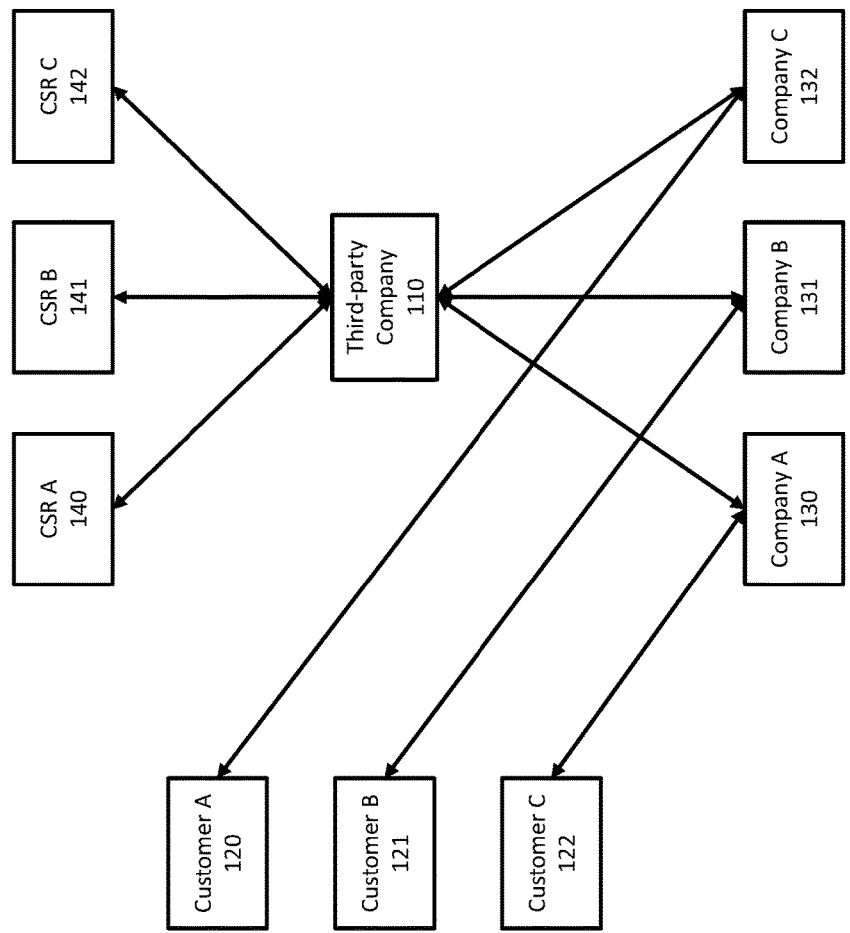
Figure 1C:
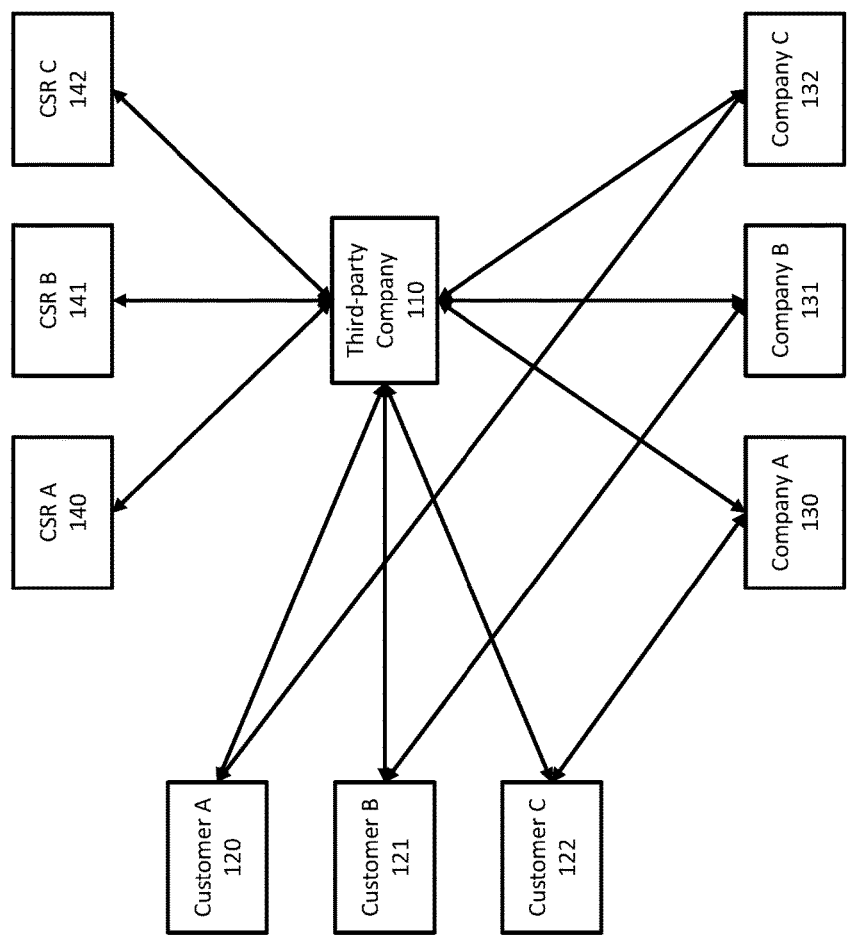

A company providing customer support to its customers may desire to use the services of a third-party company to improve the customer support experience and to reduce overall customer support costs. For example, a company may find it more cost effective to use semantic processing services of a third-party company than to implement its own semantic processing services. FIGS. 1A-C illustrate three different architectures that may be used by a company to obtain assistance from a third-party company in providing customer support to its customers.

FIG. 1A illustrates a system 101 that allows a third-party company 110 to provide customer support services to multiple companies where the third-party company 110 is an intermediary between the customer and the company for all communications between the customer and the company. In FIG. 1A, third-party company 110 is providing customer support services to company A 130, company B 131, and company C 132. Third-party company 110 may provide customer support services to any number of companies. For convenience of illustration, third-party company 110 is referenced throughout the present disclosure, but the term third-party company 110 should be understood broadly. In certain embodiments, third-party company 110 may be a subsidiary, business unit, or affiliate of one or more companies.

Customers of each company may seek customer support from a company via third-party company 110, and it may or may not be apparent to the customers whether they are seeking customer support directly from the company or via third-party company 110. For example, customer A 120 may be seeking support from company A 130, customer B 121 may be seeking support from company B 131, and customer C 122 may be seeking support from company C 132.

Third-party company 110 may assist a company in providing customer support in a variety of ways. In some implementations, third-party company 110 may assist in connecting a customer with a customer service representative (CSR) working on behalf of the company. For example, third-party company 110 may select a CSR, may provide a user interface to a customer to make it easier for a customer to request support, and may provide a user interface to a CSR to assist the CSR in responding to a request of a customer.

In FIG. 1A, third-party company 110 has connected customer A 120 with CSR A 140, has connected customer B 121 with CSR B 141, and has connected customer C 122 with CSR C 142. Each CSR may have any appropriate relationship with the company on behalf of which it is providing customer support. For example, a CSR may be an employee or contractor of a company and providing customer support to only customers of that company, or a CSR may be providing services to multiple companies and providing support to customers of the multiple companies at the same time.

FIG. 1B illustrates a system 102 that allows third-party company 110 to provide customer support services to multiple companies where third-party company 110 communicates with the companies but does not communicate directly with customers. In FIG. 1B, the customers have network connections with the corresponding companies but not directly with third-party company 110.

To use the customer support services of third-party company 110, a company may issue requests to servers of third-party company 110. In some implementations, third-party company 110 may provide an API (e.g., a REST API) via its servers to allow the company to use the customer support services. For example, company A 130 may receive a request from customer A 120 and desire to use the services of third-party company 110. Company A 130 may have its servers issue a request to servers of third-party company 110 to determine if a message meets a desired quality level or to modify a message to meet a desired quality level. In some implementations, the request from company A 130 to third-party company 110 may include all information needed for third-party company 110 to provide its services, such as the text of a message. In some implementations, the servers of third-party company 110 may request information from servers of company A 130 in providing customer support services.

FIG. 1C illustrates a system 103 that allows third-party company 110 to provide customer support services to multiple companies where customers may communicate directly with the corresponding company and/or third-party company 110. In FIG. 1C, third-party company 110 may provide customer support services to companies using any combination of the techniques described above. In FIG. 1C, the customers may have network connections with both the corresponding companies and third-party company 110.

Where customers are connected to both a company and third-party company 110, each of the two connections may be used for different kinds of requests. For example, where the customer is interacting with the company in a way that does not require the services of third-party company 110 (e.g., navigating a web site of the company), the customer may use the network connection with the company. Where the customer is interacting with the company in a way that uses the services of third-party company 110, the connection with third-party company 110 may be used. It may not be apparent to the customer whether the customer is using a network connection with the company or with third-party company 110.

Figure 2A:
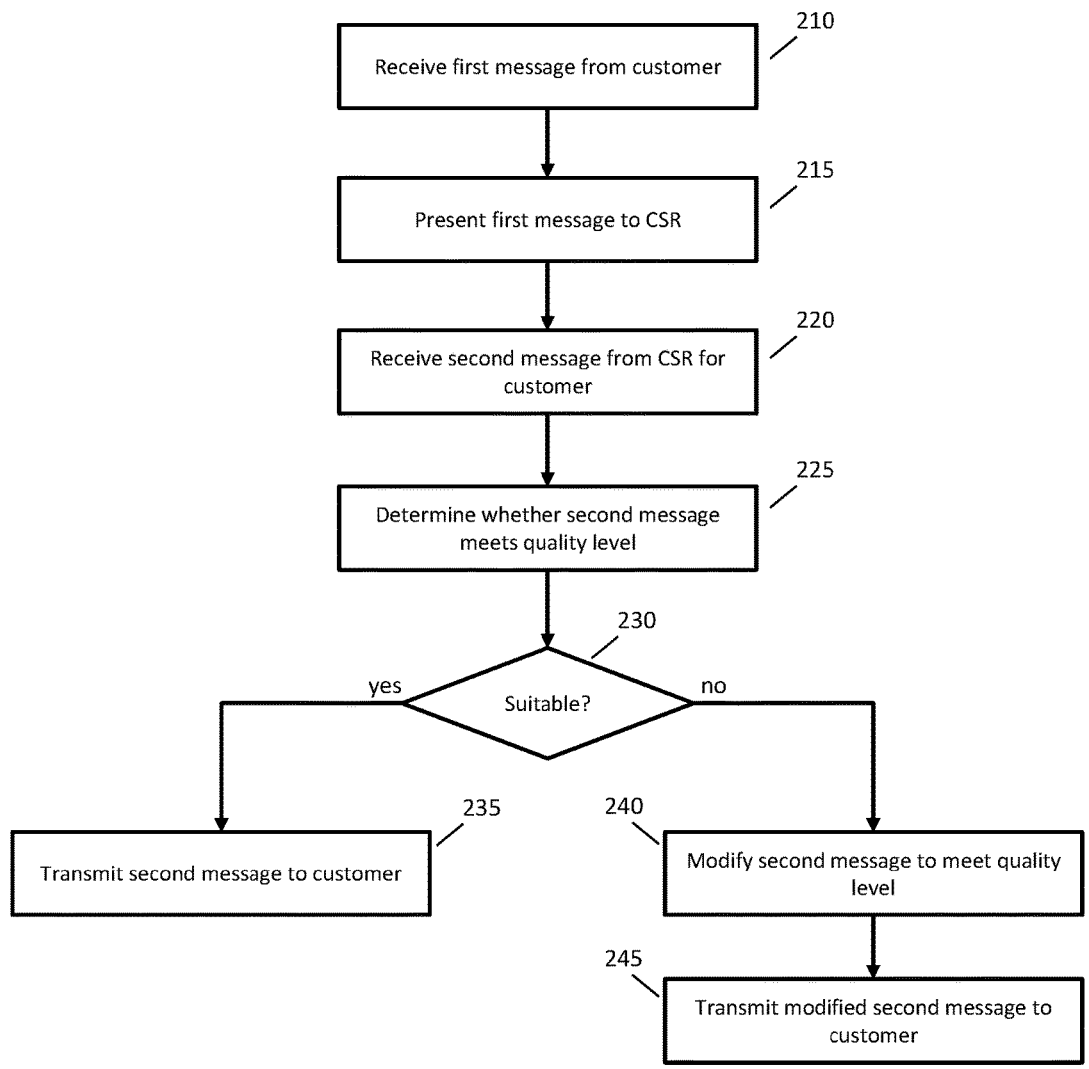
FIGS. 2A and 2B are flowcharts of example implementations of modifying a message maintain a desired quality level.
Figure 2B:
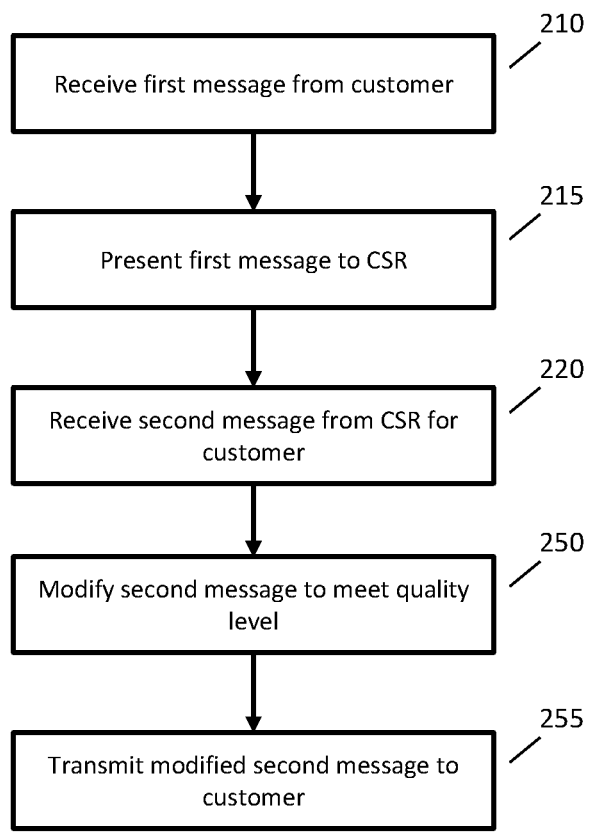

FIGS. 2A and 2B are flowcharts illustrating example implementations of modifying messages from a CSR to maintain a desired quality level or score. In FIGS. 2A and 2B and other flowcharts herein, the ordering of the steps is exemplary and other orders are possible, not all steps are required, steps may be combined (in whole or part) or sub-divided and, in some implementations, some steps may be omitted or other steps may be added. The process described in any flowcharts throughout the present disclosure may be implemented, for example, by any of the computers or systems described herein.

At step 210 of FIG. 2A, a first message of a customer is received from a customer device. The customer device may be any appropriate device, such as a smart phone, tablet, wearable device, or Internet of things device. The customer may submit the first message using any appropriate techniques, such as typing or speaking a message to an app running on customer device (e.g., an app of the company or a third-party app created for processing customer requests), typing or speaking a message on a web page, sending a text message, or sending an email. As used herein, a text message includes any message sent as text including but not limited to a message sent using SMS (short message service) or a special-purpose application (e.g., Facebook messenger, Apple iMessage, Google Hangouts, or WhatsApp).

At step 215, the first message is presented to a CSR. A user interface (UI) may be presented to a CSR to make it easier for the CSR to respond to customers and to respond to multiple customers simultaneously. A UI may be presented to a CSR using any appropriate techniques. In some implementations, a CSR may use a website provided by a third-party company. For example, a CSR may sign in to the website with a user name and password. In some implementations, a CSR may use a special-purpose application, such as an application running on a desktop computer, laptop, tablet, smart phone, or other device. A CSR may communicate with a customer through the UI using any appropriate techniques, such as typing a message or speaking a message that is transcribed to text using speech recognition.

At step 220, a second message from the CSR for the customer is received from a device of the CSR. For example, the CSR may type the second message and cause it to be transmitted. At this point, at least in some implementations, the second message has been received by the company or a third-party company, but the second message is not yet transmitted to the customer.

At step 225, it is determined whether the second message meets a quality level imposed by the company. For example, the second message may be processed with a classifier that outputs a binary yes/no decision or may output a quality score that is then compared with a threshold. If the second message meets the quality level, then at step 230, processing proceeds to step 235 where the second message is transmitted to the customer.

If the second message does not meet the quality level, then at step 230 processing proceeds to step 240 where the second message is modified to meet the company's quality level, such as by using any of the techniques described herein. At step 240, the modified second message is transmitted to the customer.

For FIG. 2B, steps 210, 215, and 220 may be the same as the corresponding steps of FIG. 2A. At step 250, after receiving the second message from the CSR for the customer, the second message is modified to ensure that it meets the quality level imposed by the company. For step 250, the second message is not first classified to determine if the second message meets the quality level, and thus step 250 may be performed on messages that already meet the quality level. In some instances, the modified second message may be the same as the second message because no modification was needed to improve the quality of the message. At step 255, the modified second message is transmitted to the customer.

Now described are techniques for determining whether a message meets a desired (or imposed) quality level and techniques for modifying a message so that it meets the desired quality level. To implement these techniques, various models or classifiers may be trained using a training corpus that includes messages that have been marked or annotated as meeting the quality level and messages that have been marked or annotated as not meeting the quality level. For example, the messages may be marked by trained company employees.

A first portion of an example training corpus may be referred to as parallel message pairs. Each pair of the parallel message pairs includes an unsuitable message (e.g., a message actually sent by a CSR) and a suitable message, where the unsuitable message does not meet the quality level and the suitable message is a modified version of the unsuitable message that does meet the quality level. For example, the unsuitable message may be "Yeah, what do you need?" and the suitable message may be "Good morning, how can I help you today?" While parallel message pairs are described in a one-to-one correlation, messages of a training corpus may also have other relationships, such as a one-to-many relationship (e.g., multiple unsuitable messages corresponding to a single suitable message) or a many-to-many relationship. In some implementations, parallel message pairs include other types of relationships between messages.

A second portion of the training corpus may be referred to as nonparallel messages. The nonparallel messages include messages that have been marked as unsuitable and messages that have been marked as suitable, but there is not necessarily any known relation between the unsuitable messages and the suitable messages.

Input Message Data

The techniques described herein process words of a message to classify the message as being suitable or unsuitable and to modify a message to generate a suitable message. For both of these types of operations, an input message is being processed and the words of the message may be transformed into a more suitable format for processing.

The models and classifiers described herein may generally be trained with a fixed vocabulary of words that include most or nearly all words that are likely to appear in messages. For example, the vocabulary may include the 50,000 most common words in messages sent by CSRs. Where a word used by a CSR is not in this vocabulary, the word may be referred to as an out-of-vocabulary word (OOV word).

In some implementations, the words of the message may be transformed into word embeddings. A word embedding is a vector in an N-dimensional vector space that represents the word but does so in a manner that preserves useful information about the meaning of the word. For example, the word embeddings of words may be constructed so that words with similar meanings or categories may be close to one another in the N-dimensional vector space. For example, the word embeddings for "cat" and "cats" may be close to each other because they have similar meanings, and the words "cat" and "dog" may be close to each other because they both relate to pets.

Any appropriate techniques may be used to compute word embeddings from a training corpus (e.g., stored messages from CSRs). For example, the words of the training corpus may be converted to one-hot vectors where the one-hot vectors are the length of the vocabulary and the vectors are 1 in an element corresponding to the word and 0 for other elements. The one-hot vectors may be processed using any appropriate techniques, such as the techniques implemented in Word2vec or GloVe software.

A word embedding may be created for each word in the vocabulary. An additional embedding or token may also be added to represent OOV words. When processing an input message, the words of the message may be replaced by the corresponding word embeddings.

A model or classifier that processes words of a message, however, may not be able to understand inadvertent or intentional misspellings of words. Where a word is misspelled, the misspelled word likely does not appear in the vocabulary, and thus is an OOV word. Some models and classifiers may thus have limited ability to process an OOV word because less or no information may be available for the models to understand the meaning of the OOV word. To improve the performance of a model or classifier, the model or classifier may process characters of the words instead of, or in addition to, the words of the message.

Figure 3:
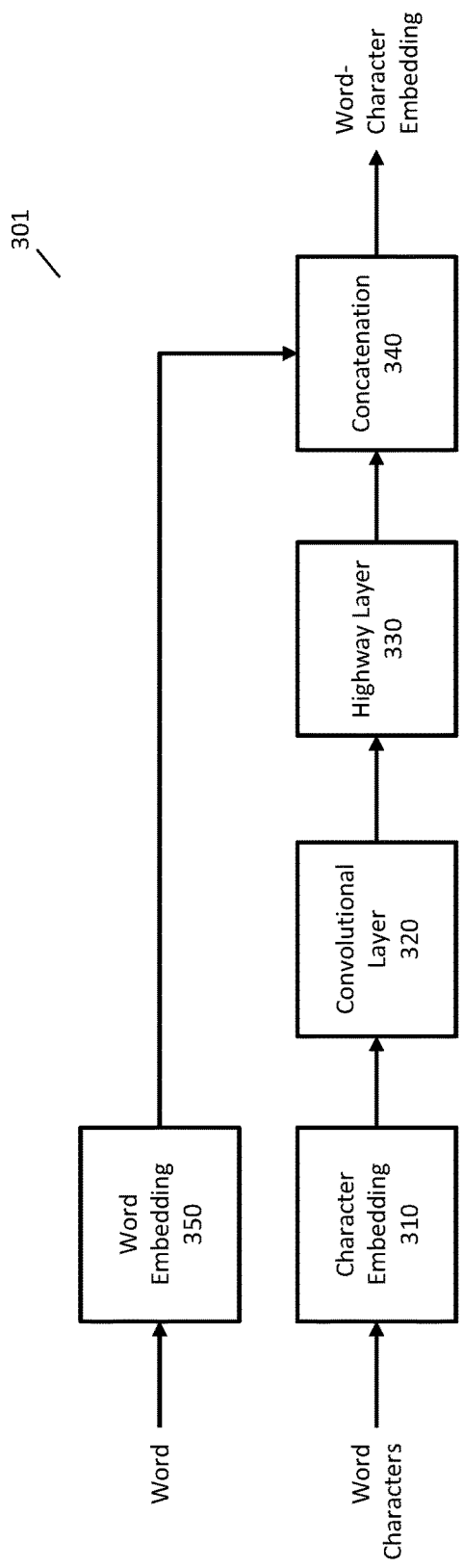
FIG. 3 is an example system for computing an input vector for a word using a word embedding and character embeddings.

FIG. 3. illustrates an example of a system 301 that modifies a word embedding to include information about characters in the word, and the modified word embeddings are referred to as word-character embeddings. The word-character embeddings generated by system 301 may be used in place of or in addition to word embeddings for any of the techniques described herein.

In FIG. 3, word embedding component 350 may process a word of the message and output a word embedding. The word embedding may be computed using any appropriate techniques, such as any of the techniques described above.

In FIG. 3, character embedding component 310 may sequentially process the characters of the word and output a character embedding for each character. Similar to a word embedding, a character embedding represents a character in an N-dimensional vector space. The size of the vector space for a character embedding may be significantly smaller than the size of the vector space for a word embedding since the number of possible characters will be much less than the number of possible words. The character embeddings may be computed using any appropriate techniques, such as any of the techniques described above for the word embeddings. In some implementations, one-hot vectors for the characters may be used in place of character embeddings.

The word embeddings and character embeddings may be computed in advance and word embedding component 350 and character embedding component 310 may perform a lookup for each received word and character to obtain the corresponding embedding.

A word-character embedding may be computed using the word embedding of the word and the character embeddings for each character of the word. Any appropriate techniques may be used to create a word-character embedding from the individual embeddings. For example, a word-character embedding may be created by concatenating the word embedding with each of the character embeddings. In some implementations, other techniques may be used, such as the techniques illustrated by FIG. 3.

In FIG. 3, convolutional layer component 320 may receive a representation of characters of the word, such as character embeddings, and process them to generate a feature vector that represents the sequence of characters. The feature vector may capture information about relationships between adjacent characters or characters that are close to each other as determined by a filter of the convolutional layer. Convolutional layer component 320 may implement any appropriate convolutional neural network.

In some implementations, convolutional layer component 320 may perform a sequence of three operations: (i) filtering, (ii) non-linear activation, and (iii) max-pooling. To perform filtering, the character embeddings may be stacked to create a matrix where the size of the matrix is the number of characters by the length of the character embeddings. A two-dimensional filter is then applied to this matrix by performing a convolution of the matrix and the filter. The filter may have a short length in one or both directions to capture short-term information, such as relationships between adjacent characters or characters that are close to each other. The output of this step is a matrix that is referred to as filtered character embeddings. To perform non-linear activation, a function of the elements of the filtered character embeddings is computed, such as a tan h function or a rectified linear unit. The output is referred to as activated filtered character embeddings. To perform max-pooling, a maximum value is selected across the columns of the activated filtered character embeddings. The output of the max-pooling step is referred to as a feature vector that represents the characters in the word.

In some implementations, system 301 may include multiple convolutional layer components where each convolutional layer component processes the sequence of character embeddings using a different filter (such as a different filter width) and outputs a feature vector corresponding to the filter width. Where multiple convolutional layers are included, the feature vectors from the convolutional layers may be combined or concatenated to generate a combined feature vector that is used in the next stage of processing.

Highway layer component 330 may process the feature vector generated by convolutional layer 320 (or from multiple convolutional layers) and output a modified feature vector. Highway layer component 330 may implement any appropriate techniques for a highway layer, such as $$f = g \odot \tilde{f} + (1-g) \odot m$$

$$\tilde{f} = \sigma_f(W_f y + b_f)$$

$$g = \sigma_g(W_g y + b_g)$$

where m is the feature vector computed by convolutional layer 320; f is the modified feature vector computed by highway layer 330; $\sigma_f$ is a non-linearity; $\sigma_g$ is a non-linearity (typically a sigmoid); $W_f$, $W_g$, $b_f$ and $b_g$ are matrices or vectors of parameters; $\odot$ is an element-wise product; g may be referred to as a transform gate of the highway later; and 1-g may be referred to as the carry gate of the highway layer. The highway layer allows for further processing of the feature vector (such as with a multi-layer perceptron) but outputs a combination of the processed feature vector and the unprocessed feature vector to allow increased flow of information about the output of the convolutional layer in the final output.

Concatenation component 340 may receive a character feature vector, such as the modified feature vector from highway layer component 330, and the word embedding from word embedding component 350, and combine or concatenate them together to generate a word-character embedding that may be used in place of the word embedding described above.

In some implementations, highway layer 330 may not be used and concatenation component 340 may instead combine the feature vector computed by convolutional layer 320 with the word embedding. In some implementations, highway layer component 330 may be replaced by another layer, such as a multilayer perceptron, or multiple highway layers may be used. In some implementations, one or both of convolutional layer component 320 and highway layer component 330 may be replaced by a different neural network, such as a recurrent neural network. In some instances, the word whose characters are being processed may be an OOV word and the word embedding may correspond to a special token indicating an OOV word.

Accordingly, a word-character embedding may be created for each word of an input message using any of the techniques described above. Because a word-character embedding includes information about both words and characters, it may allow models and classifiers to provide improved performance over models and classifiers that use only word embeddings. For example, for a misspelled word, a model or classifier may be able to determine useful information about the misspelled word using the characters and context of the misspelled word.

In some implementations, the character feature vectors for the words of a message may be used as the input for the message, and the word embeddings may not be used. In such implementations, concatenation component 340 may not be needed.

In some implementations, the word-character embeddings may be used as a preprocessing step. For each word of an input message that is an OOV word, the word-character embedding of the OOV word may be compared with the word-character embeddings of words in the vocabulary to replace the OOV word with a word from the vocabulary that best matches the OOV word.

Message Quality Classifiers

Figure 4A:
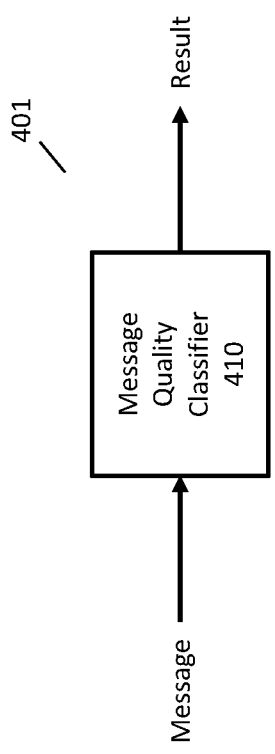
FIGS. 4A and 4B are example systems for determining if a message meets a desired quality level.
Figure 4B:
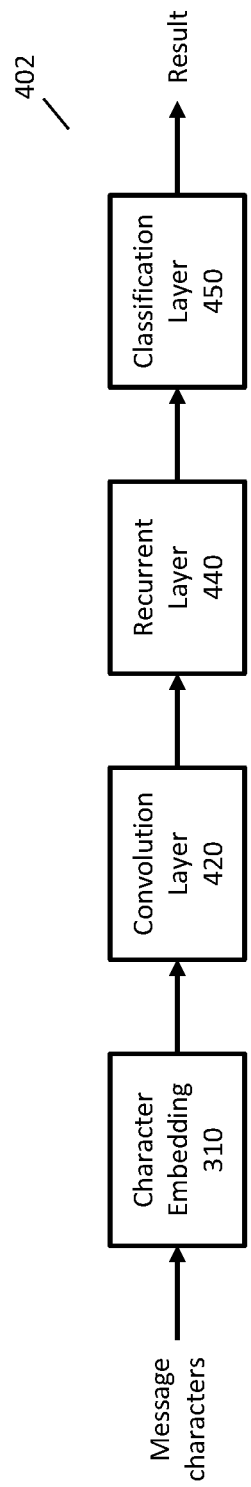

FIGS. 4A and 4B are example systems for implementing a message quality classifier. FIG. 4A is a system 401 that includes message quality classifier component 410. Message quality classifier component 410 receives words of a message (or any of the embeddings described above) as input and outputs a classification result. For example, the result may be a yes/no decision or a score that indicates a quality level that may be compared to a quality threshold to determine if the message is suitable or unsuitable. Any appropriate classifier may be used for message quality classifier component 410. For example, message quality classifier component 410 may receive or compute n-gram features of words of the message and process the features with a support vector machine to output a classification result.

In some implementations, message quality classifier 410 may be implemented using a recurrent neural network that processes a sequence of character embeddings, word embeddings, or word-character embeddings. For example, the output of the recurrent neural network may be processed by a sigmoid layer to make a classification decision.

As noted above, a classifier that processes words of a message may not be able to understand unintentional or intentional misspellings of words, such as if a CSR enters the word "@ssh0le." To improve the performance of a message quality classifier, a classifier may process characters of the words instead of or in addition to the words of the message. FIG. 4B illustrates a system 401 that implements a message quality classifier using characters of the message.

In FIG. 4B, the characters of the message may be processed by character embedding component 310, as described above, to generate a sequence of character embeddings.

Convolutional layer 420 may process the sequence of character embeddings for the words of the message to output a sequence of feature vectors that represent the characters of the message. Convolutional layer 420 may implement the same techniques described above for convolutional layer 320 or may implement variations of those techniques. In some implementations, convolutional layer 420 may not perform a max-pooling operation, may output feature vectors that represent character n-grams, and may output feature vectors that cross word boundaries. In some implementations, convolutional layer 420 may include multiple convolutional layers that are stacked or in parallel to each other. In some implementations, convolutional layer component 420 may directly process one-hot vectors of the characters and character embedding component 310 may be skipped. Convolutional layer 420 may output a sequence of feature vectors, where the feature vectors corresponds to characters of the message.

Recurrent layer component 440 processes the sequence of feature vectors output by convolutional layer 420 and outputs a second sequence of feature vectors. Recurrent layer component 440 may implement any appropriate recurrent neural network, such as a recurrent neural network with long-short term memory, a bidirectional neural network, or any of the neural networks described in the incorporated patents. Because a recurrent neural network includes a state vector that is updated after processing each of the first sequence of feature vectors, recurrent layer component 440 may capture longer term relationships in the sequence of characters.

Classification layer component 450 processes the second sequence of features vectors to output a classification result, such as whether the message is suitable or not. Any appropriate classifier may be used, such as a logistic regression classifier. In some implementations, classification layer component 450 may further process the second sequence of feature vectors output by recurrent layer component 440 (e.g., by max-pooling them before classification) or may process the final state vector generated by recurrent layer component 440.

In some implementations, FIG. 4B may include additional layers, either in sequence or in parallel. For example, multiple instances of convolutional layers or recurrent layers may be used sequentially. For another example, multiple convolutional layers may be used in parallel (e.g., with different filter lengths or parameters), and the outputs of the multiple convolutional layer components may be combined and input to a recurrent layer component.

Accordingly, the message quality classifier of FIG. 4B may classify a message as suitable or not by processing the characters of the message in a way that considers shorter-term relationships (as determined by convolutional layer component 420) and longer-term relationships (as determined by recurrent layer component 440).

The message quality classifiers of FIGS. 4A and 4B may be trained using any appropriate techniques. For example, either or both of the parallel message pairs and the nonparallel messages may be used to train one or more layers using back propagation and/or stochastic gradient descent.

Once it is determined that a message is not suitable by processing the message with a message quality classifier (or if a message quality classifier is not used as in FIG. 2B), the unsuitable message may be automatically modified to make it a suitable message or to ensure a suitability of the message. Any appropriate techniques may be used to modify an unsuitable message to make it suitable. Described below are several variations: (i) generative supervised techniques, (ii) generative semi-supervised techniques, and (iii) generative unsupervised techniques.

Generative Supervised Techniques

Figure 5A:
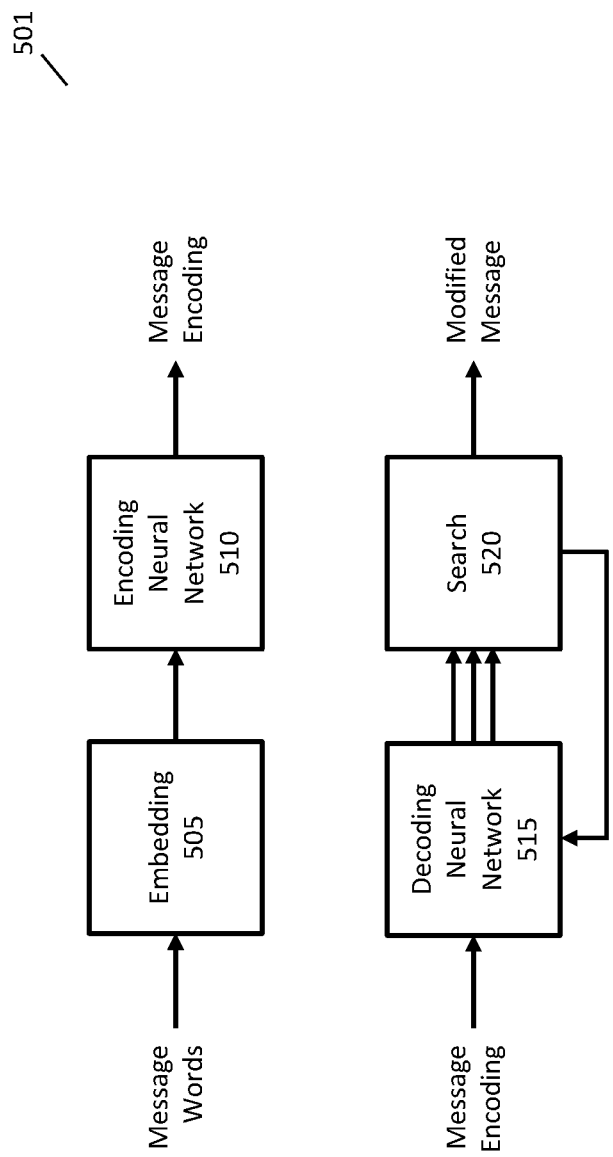
FIGS. 5A-5C are example systems for modifying a message using generative supervised techniques.

In some implementations, generative supervised techniques may be used to modify a message to convert an unsuitable message into a suitable message. FIG. 5A illustrates an example of a system 501 that may be used to modify a message using generative supervised techniques.

The words of the message to be modified are input to embedding component 505 to generate embeddings of the words of the message. The embeddings may include one or more of word embeddings, character embeddings, or word-character embeddings. The embeddings are processed sequentially by encoding neural network 510 to compute a message encoding vector that represents the message. Any appropriate neural network may be used, such as a recurrent neural network or a bidirectional recurrent neural network. This message encoding vector may then be used to sequentially generate the words of a modified message that are more suitable for presentation to a customer.

To sequentially generate the modified message, the message encoding vector is input to decoding neural network 515 to generate one or more possible words to start the modified message. Any appropriate neural network may be used, such as a recurrent neural network. Decoding neural network 515 may output a vector whose length is the size of the vocabulary where each element is a score or probability indicating the most appropriate words as the first word of the modified message. One or more first words may be selected (e.g., a number of highest scoring words or words having a score above a threshold) and input to search component 520 as candidates for a first word of the modified message. For each of the selected first words, decoding neural network 515 may then output a vector that may be used to determine one or more second words to follow each of the first words. Accordingly, a tree or graph of possible words sequences for the modified message may be created where a path through the graph corresponds to a possible sequence of words in a modified message.

Search component 520 may compute scores for each of the possible sequences of words in the graph (e.g., by combining the scores of individual words as determined by decoding neural network 515), and prune lower scoring word sequences to reduce the computational complexity of the search. For example, search component may implement a beam search in deciding to keep some word sequences and prune other word sequences. A stopping criterion may be determined for each path of the search graph, such as decoding neural network 515 selecting a special stop token to indicate that the previous word was the last word of a possible modified message. After all word sequences have ended, search component 520 may select a highest scoring word sequence as the modified message.

Any appropriate techniques may be used for the components of FIG. 5A, such as any of the techniques described in the incorporated patents.

Figure 5B:
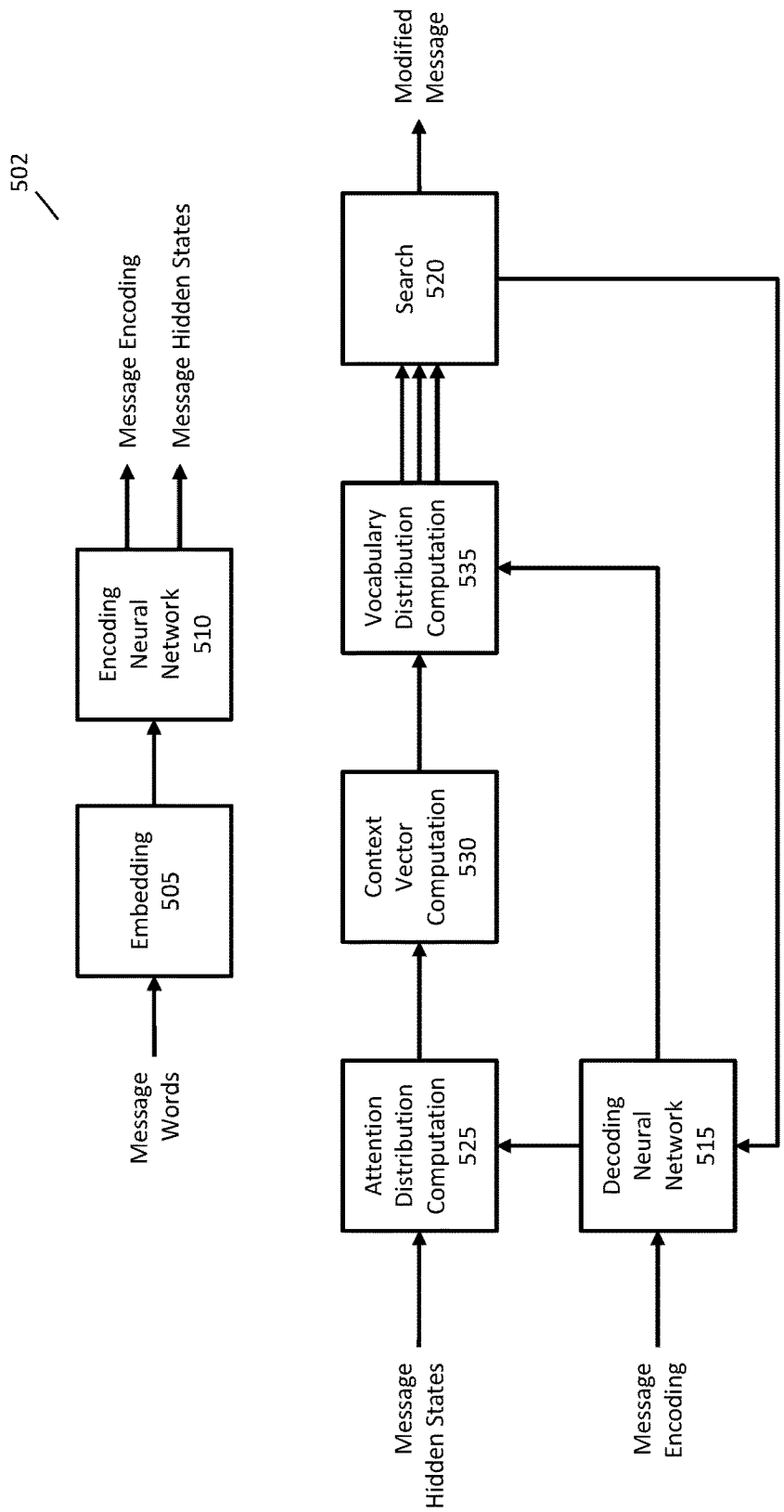

In some implementations, a modified message may be generated using an attention distribution, such as described by system 502 of FIG. 5B. In FIG. 5B, the words of an input message are processed to generate a message encoding vector, as above, but in addition, hidden state vectors of encoding neural network 510 corresponding to the words of the message may be used to generate a modified message. The message encoding vector represents the entire message, and the individual hidden state vectors correspond to individual words to allow the message generation to pay attention to the specifics of individual words in generating a modified message.

In FIG. 5B, embedding component 505 may generate embeddings for the words of the message as in FIG. 5A. Encoding neural network 510 may again be any appropriate neural network, such as the following recurrent neural network (or a corresponding bidirectional recurrent neural network or a network with a long short-term memory component):

$$h_t = \sigma_h(U_h x_t + V_h h_{t-1} + b_h)$$

where $x_t$ is an embedding of the $t^{th}$ word, $h_t$ is a hidden state corresponding to the $t^{th}$ word, $h_0$ is an initial state vector, $\sigma_h$ is an activation function (e.g., tan h or a sigmoid), and $U_h$, $V_h$, and $b_h$ are matrices or vectors of parameters.

After processing a message of n words, a final output vector $h_n$ may be used as the message encoding vector and the hidden states $h_t$ for t from 1 to n may be used as the message hidden states. The message encoding vector and hidden state vectors may then be used to generate a modified message.

In FIG. 5B, decoding neural network 515 may again be any appropriate neural network, such as the following recurrent neural network (or a corresponding bidirectional recurrent neural network or a network with a long short-term memory component):

$$s_t = \sigma_s(U_s y_t + V_s s_{t-1} + b_s)$$

$$p_t = \sigma_p(W_p s_t + b_p)$$

where $y_t$ is an embedding of the $t^{th}$ word of a generated message, $s_t$ is a hidden state corresponding to the $t^{th}$ generated word, $p_t$ is an output vector to select the $t^{th}$ word of the generated message, $s_0$ is an initial state vector that may be set to the message encoding vector, $\sigma_s$ is an activation function, and $\sigma_p$ is an activation function (such as a softmax function), and $U_s$, $V_s$, $W_p$, $b_s$, and $b_p$ are matrices or vectors of parameters. To start the message generation, $y_1$ may be set to a special value, such as a token indicating the start of a message to be generated.

This neural network may be used to generate a modified message in a similar manner as described in FIG. 5A. For a first iteration, $p_1$ may be a vector whose length is the size of the vocabulary, and one or more first words may be chosen based on the values of the elements of $p_1$. For a second iteration, an embedding may be obtained for one of the selected first words, and this embedding may be $y_2$ for a second iteration. As used herein, the $x_t$ and $y_t$ may refer to a word of a message or an embedding of the word of the message.

Instead of selecting words for the generated message based only on $p_t$, FIG. 4B uses an attention distribution that is computed using the state vector $s_t$ of decoding neural network 515. For each iteration of decoding neural network 515, attention distribution computation component 525 computes an attention distribution. Any appropriate techniques may be used to compute an attention distribution, such as:

$$e_t^i = w_e^T(U_e h_i + V_e s_t + b_e)$$

$$a_t^i = \frac{\exp(e_t^i)}{\sum_j \exp(e_t^j)}$$

where $h_i$ is the hidden state vector of the encoding neural network corresponding to the $i^{th}$ word of the input message, $s_t$ is the hidden state vector of the decoding neural network corresponding to the $t^{th}$ generated word, $a_t$ is an attention vector that indicates an attention value for each of the words of the input message, and $U_e$, $V_e$, and $b_e$ are matrices or vectors of parameters. Attention distribution computation component 525 may output attention vector $a_t$ when generating the $t^{th}$ word of a modified message.

Context vector computation component 530 may then compute a context vector by weighting the hidden state vectors of the encoding neural network according to the attention distribution:

$$c_t = \sum_{i=1}^{n} a_t^i h_i$$

where $a_t^{it}$ is the $i^{th}$ element of the attention vector $a_t$.

Vocabulary distribution computation component 535 may then compute a vocabulary distribution vector whose length is the size of the vocabulary, and one or more next words of a generated message may be selected based on the values of this vector (e.g., words whose values are above a threshold). In some implementations, a vocabulary distribution vector may be computed as $$p_t = \sigma_p(W_p[s_t, c_t] + b_p)$$

where $[s_t, c_t]$ is a concatenation of the decoding neural network state vector and the context vector, $\sigma_p$ is a nonlinearity (such as softmax), and $W_p$ and $b_p$ are matrices or vectors of parameters.

One or more next words of a generated message are then received by search component 520, which selects a highest scoring sequence of words, such as by using any of the techniques described above for FIG. 5A.

Figure 5C:
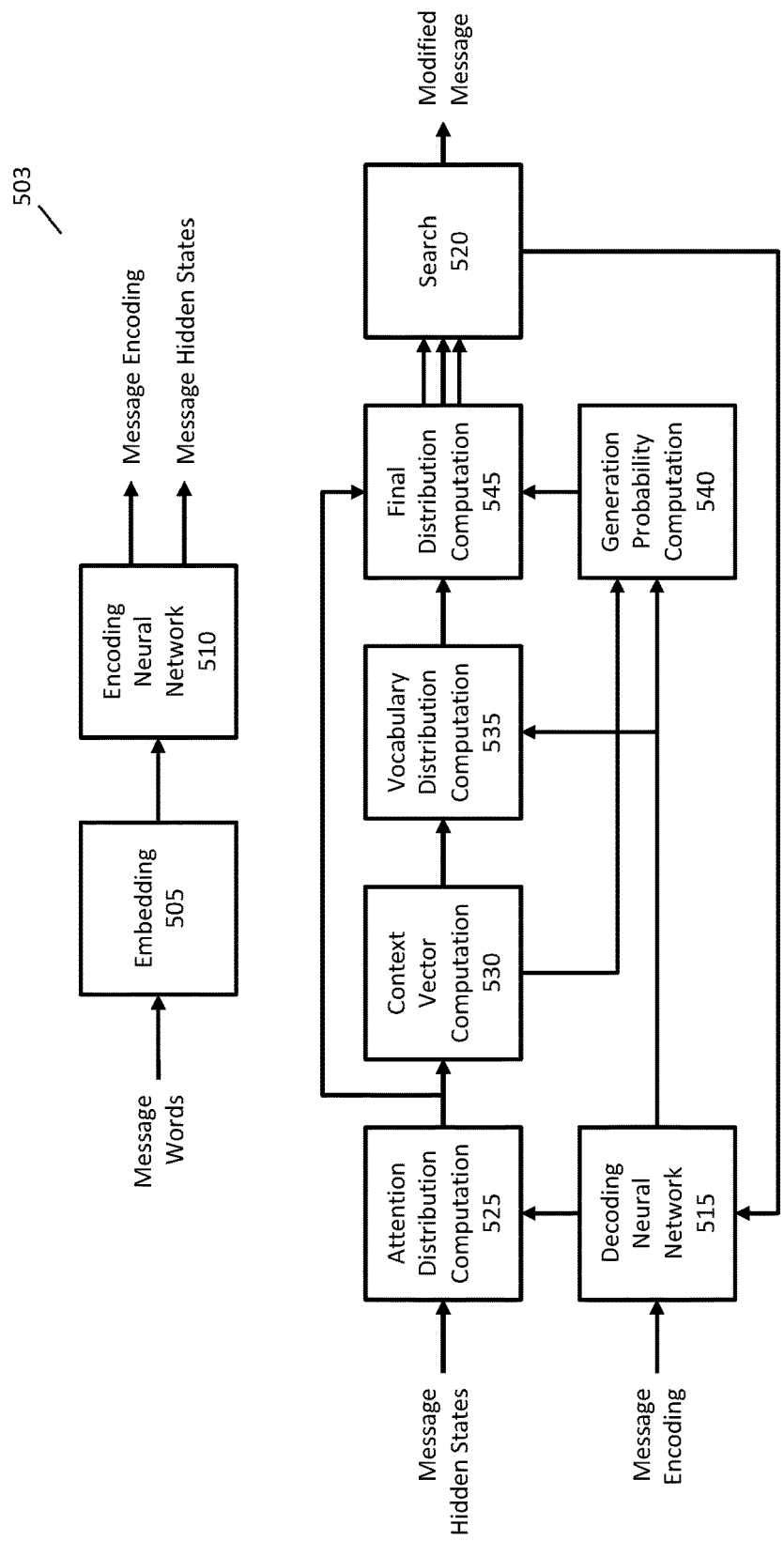

In some implementations, a modified message may be generated using an attention distribution and a pointer-generator network, such as described by system 503 of FIG. 5C. In FIG. 5C, the words of an input message are processed to generate a message encoding vector and hidden state vectors corresponding to words of the input message as described above for FIG. 5B. A pointer-generator network is a generalization of the system of FIG. 5B. In FIG. 5B, a word was selected from a vocabulary of words, but in FIG. 5C a word may be selected from the vocabulary of words or from the input message. In some instances, the input message may include words that are not in the vocabulary, such as an OOV word (e.g., a name of a person, street, or city, or less common words, such as technical terms). By allowing the generation of a modified message to use words from the original message, a more accurate modified message may be generated.

In FIG. 5C, the components may be the same as FIG. 5B, except that two new components are added: generation probability computation component 540 and final distribution computation component 545.

Generation probability computation component 540 may compute a generation probability value that indicates whether a word from the vocabulary or a word of the input message is to be favored in selecting the next word. For example, where the generation probability is high, a word from the vocabulary may be favored, and where the generation probability is low, a word from the input message may be favored. In some implementations, the generation probability may be computed as:

$$q_t = \text{sigmoid}(u_q^T c_t + v_q^T s_t + w_q^T y_t + b_q)$$

where $c_t$ is the context vector, $s_t$ is the hidden state vector of the decoding neural network, $y_t$ is an embedding of the most recently generated word, and $u_q$, $v_q$, $w_q$, and $b_q$ are vectors of parameters.

Final distribution computation component 545 may then use the generation probability to compute a final distribution over the words in the vocabulary by modifying the vocabulary distribution computed by vocabulary distribution computation component 535 using the attention distribution and the generation probability. In some implementations, the final distribution, denoted as $p_t^*$, may be computed as:

$$p_t^* = q_t p_t + (1 - q_t) \sum_{i=1}^{n} a_t^i \delta(x_i)$$

where $p_t$ is the vocabulary distribution computed by vocabulary distribution computation component 535, $q_t$ is the generation probability computed by generation probability computation component 540, $a_t^i$ is the $i^{th}$ element of the attention vector $a_t$, $x_i$ is the $i^{th}$ word of the input message, and $\delta(x_i)$ is a vector whose length the size of the vocabulary and has a value of 1 for $x_i$ and 0 for all other words.

In some instances, a word of the input message may be an OOV word and the vectors $p_t$ and $p_t^*$ may be extended to include the OOV word from the input message.

Accordingly, final distribution computation component 545 may output a final vocabulary distribution that may have an increased weight for words in the input message based on the value of the generation probability. By favoring important words in the input message, these words may have an increased probability of appearing in the modified message. One or more high scoring words in the final vocabulary distribution may then be used by search component 520 in generating a modified message.

A modified message, such as a modified message generated by systems 501, 502, or 503, may then be transmitted to a customer.

Any of the models or parameters for implementing generative supervised techniques may be trained using the parallel message pairs. For each parallel message pair, the input to system may be set to the unsuitable message, the output of the system may be set to the corresponding suitable message, and the parameters may be updated using a training process. For example, back propagation and/or stochastic gradient descent may be used to train the parameters of the neural networks.

Generative Semi-Supervised Techniques

The generative supervised techniques described above may be trained using the parallel message pairs from the training data, but may not use non-parallel messages that may be available in a training corpus. By training a model using non-parallel messages in a training corpus in addition to parallel message pairs, the resulting models may provide better performance (e.g., the model may, in general, generate more suitable messages than models trained without non-parallel messages) than models trained using only the parallel message pairs. Now described are generative semi-supervised techniques that train models using both non-parallel messages and the parallel message pairs.

FIGS. 6A-6D illustrate systems for training a message modification model that uses both parallel message pairs and non-parallel messages from a training corpus. In FIG. 6A, message modification component 610 implements any of the generative supervised techniques described above to process an unsuitable message to generate a suitable message.

FIG. 6B implements the opposite of FIG. 6A. In FIG. 6B, reverse modification component 620 processes a suitable message to generate an unsuitable message. Reverse modification component 620 may be implemented using any of the generative supervised techniques described above where the role of suitable messages and the unsuitable messages are reversed. Reverse modification component 620 may not have direct practical application, but allows for additional training of message modification component 610 using the non-parallel messages.

Message modification component 610 and reverse modification component 620 may be combined to implement auto-encoders as illustrated by FIG. 6C and FIG. 6D. In FIG. 6C, an auto-encoder modifies an unsuitable message to a suitable message using message modification component 610 and this suitable message is then processed by reverse modification component 620 to generate an unsuitable message (which may be the same as or different from the original unsuitable message). Similarly, in FIG. 6D, an auto-encoder modifies a suitable message to an unsuitable message using reverse modification component 620 and this unsuitable message is then processed by message modification component 610 to generate a suitable message (which may be the same as or different from the original suitable message). The auto-encoders of FIGS. 6C and 6D may not have direct practical application, but allow for additional training of message modification component 610 using the non-parallel messages.

In FIGS. 6A and 6B, the models may be trained using the parallel message pairs since a parallel message pair may be used for the input and output of each. In FIGS. 6C and 6D, the models may be trained using the non-parallel messages since only one of a suitable or non-suitable message is used for each.

In one example, let $(X_i^P, Y_i^P)$ denote a parallel message pair from the training corpus for i from 1 to N, let $X_i^N$ denote non-parallel unsuitable messages from the training corpus for i from 1 to S, and let $Y_i^N$ denote non-parallel suitable messages from the training corpus for i from 1 to T. As used herein, the $X_i$ and $Y_i$ may refer to a message or to a matrix of embedding of the words of the message.

Using this training data, the parameters of message modification component 610 and reverse modification component 620 may be trained using the following objective function:

$$J(\theta_m, \theta_r) = \sum_{i=1}^{N} \log P(Y_i^P | X_i^P; \theta_m) + \sum_{i=1}^{N} \log P(X_i^P | Y_i^P; \theta_r) + \lambda_1 \sum_{i=1}^{S} \log P(X_i^N | X_i^N; \theta_m, \theta_r) + \lambda_2 \sum_{i=1}^{T} \log P(Y_i^N | Y_i^N; \theta_m, \theta_r)$$

where $\theta_m$ represents the parameters of message modification component 610, $\theta_r$ represents the parameters of reverse modification component 620, and $\lambda_1$ and $\lambda_2$ are hyperparameters that weight the importance of the parallel message pairs and the non-parallel messages. The probability in each of the summations is the probability of generating a message given another message and the first summation corresponds to FIG. 6A, the second summation corresponds to FIG. 6B, the third summation corresponds to FIG. 6C, and the fourth summation corresponds to FIG. 6D.

Any appropriate training techniques may be used to determine the model parameters ($\theta_m$ and $\theta_r$) from the training data, such as performing stochastic gradient descent on the partial derivatives of the objective function. After training, message modification component 610 may be used to process an unsuitable message to generate a suitable message.

Performing the above training process may involve optimizing the auto encoders, such as optimizing the following:

$$P(X_i^N | X_i^N; \theta_m, \theta_r) = \sum_{Y} P(Y | X_i^N; \theta_m) P(X_i^N | Y; \theta_r)$$

over all possible values of y (i.e., possible suitable messages generated from $X_i^N$ by message modification component 610). Performing such an optimization may be intractable because of the large number of possible values for Y. Accordingly, to simplify the optimization process, a fixed number of values for Y may be used during optimization, such as a number of highest scoring values generated by message modification component 610.

Generative Unsupervised Techniques

In some implementations, parallel message pairs may not be readily available, and it may be desirable to train a message modification model using a training corpus of non-parallel messages. To train a model using only non-parallel messages, generative unsupervised techniques may be used.

Figure 7:
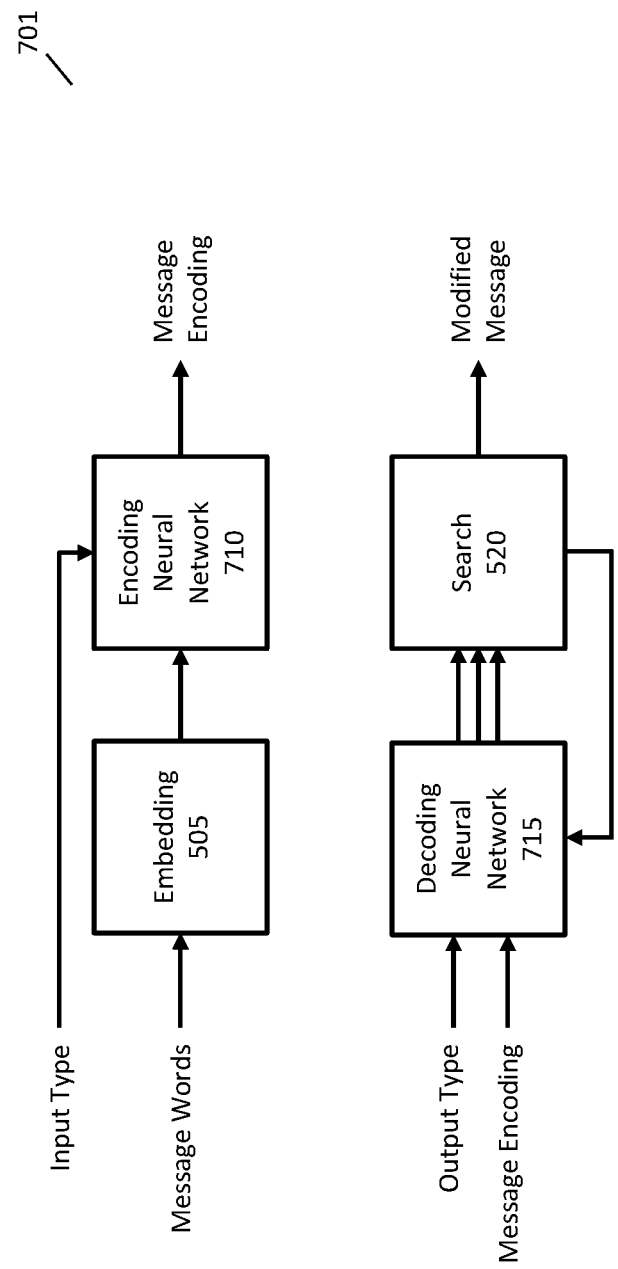
FIG. 7 is an example system for modifying a message using generative unsupervised techniques.

FIG. 7 illustrates a system 701 for generating a modified message where the system may be trained using only non-parallel messages. In FIG. 7, words of a message may be processed by embedding component 505, and the embeddings may be processed by encoding neural network 710 to generate a message encoding. This process is similar to FIG. 4A except that encoding neural network 710 receives as input an input type vector that indicates a type of the input message, such as whether the input message is an unsuitable message or a suitable message.

To generate the modified message, the message encoding is processed be decoding neural network 715 to generate one or more first words to start the modified message. As above, search component 520 may receive the one or more words and perform a search process to generate the modified message. For example, decoding neural network 715 may further generate one or more second words to follow each of the first words. This process is also similar to FIG. 4A except that decoding neural network 715 receives as input an output type vector that indicates whether the message to be generated is a suitable message or an unsuitable message.

The input and output type vectors may be vectors of real numbers that are learned during a training process where the parameters of encoding neural network 710 and decoding neural network 715 are trained. A first type vector $z_1$ may be used as a type vector for unsuitable messages, and a second type vector $z_2$ may be used as a type vector for suitable messages.

System 701 may be used to modify an unsuitable message to a suitable message, to modify a suitable message to an unsuitable message, to modify an unsuitable message to another (or the same) unsuitable message, or to modify a suitable message to another (or the same) suitable message. The different variations may be specified using the first and second type vectors.

To modify an unsuitable message to a suitable message, encoding neural network 710 processes the embeddings of the unsuitable message and the first type vector, which indicates that an unsuitable message is being processed, and outputs a message encoding. Decoding neural network 715 then processes the message encoding and the second type vector, which indicates that a suitable message should be generated, to generate the suitable message.

To modify a suitable message to an unsuitable message, encoding neural network 710 processes the embeddings of the suitable message and the second type vector, which indicates that a suitable message is being processed, and outputs a message encoding. Decoding neural network 715 then processes the message encoding and the first type vector, which indicates that an unsuitable message should be generated, to generate the unsuitable message.

To modify a first unsuitable message to a second unsuitable message, encoding neural network 710 processes the embeddings of the first unsuitable message and the first type vector, which indicates that an unsuitable message is being processed, and outputs a message encoding. Decoding neural network 715 then processes the message encoding and the first type vector, which indicates that an unsuitable message should be generated, to generate the second unsuitable message.

To modify a first suitable message to a second suitable message, encoding neural network 710 processes the embeddings of the first suitable message and the second type vector, which indicates that a suitable message is being processed, and outputs a message encoding. Decoding neural network 715 then processes the message encoding and the second type vector, which indicates that a suitable message should be generated, to generate the second suitable message.

The models and type vectors of system 701 may be trained using non-parallel messages. Conceptually, the models and type vectors are trained to satisfy two criteria. First, where system 701 is used as an auto-encoder, the input should the same as or similar to the output. That is, processing a first unsuitable message to generate a second unsuitable message should result in the first and second unsuitable messages being the same or similar (and also for processing a first suitable message to generate a second suitable message). Second, if a parallel message pair were available, then encoding the unsuitable message of the pair with the first type vector and encoding the suitable message of the pair with the second type vector, should result in message encodings that are close to each other. The second criteria may be referred to as aligning the unsuitable messages with the suitable messages.

Because parallel message pairs may not be available for training, however, other training techniques may be needed. In some implementations, an adversarial discriminator may be used to train the models and type vectors of system 701. An adversarial discriminator may process a message encoding and output a scalar that indicates whether the message encoding corresponds to an unsuitable message or a suitable message. For a known unsuitable message, the adversarial discriminator may be trained to process the message encoding of the unsuitable message and output a first value, such as 0. For a known, suitable message, the adversarial discriminator may be trained to process the message encoding of the suitable message and output a second value, such as 1. Any appropriate models may be used for an adversarial discriminator, such as a multi-layer perceptron or a convolutional neural network.

In an example, let the processing of the encoding neural network be denoted as $E(X,z)$ where E represents the processing of the encoder, X represents the embeddings of words of a message, and z represents a type vector. Accordingly, the adversarial discriminator, denoted as A, is trained such that where $X_1$ is an unsuitable message, the adversarial discriminator $A(E(X_1, z_1))$ will produce a value close to 0, and where $X_2$ is a suitable message, the adversarial discriminator $A(E(X_2, z_2))$ will produce a value close to 1.

An adversarial discriminator may be trained by minimizing the following loss function $$L_{adv}(\theta_E, \theta_A) = \sum_{i=1}^{N_1} \sum_{j=1}^{N_2} -\log A(E(X_{1,i}, z_1)) - \log(1 - A(E(X_{2,j}, z_2)))$$

where $L_{adv}$ indicates the loss function, $\theta_E$ represents parameters of the encoder, $\theta_A$ represents parameters of the adversarial discriminator, the $X_{1,i}$ are examples of unsuitable messages from the training corpus, and the $X_{2,j}$ are examples of suitable messages from the training corpus.

The loss function for the adversarial decoder may be combined with a reconstruction loss function for minimizing errors when the encoder and decoder are used as an auto-encoder. The encoder and decoder may be trained by minimizing the following loss function:

$$L_{rec}(\theta_E, \theta_D) = \sum_{i=1}^{N_1} \sum_{j=1}^{N_2} -\log p_D(X_{1,i} | z_1, E(X_{1,i}, z_1)) - \log p_D(X_{2,j} | z_2, E(X_{2,j}, z_2))$$

where $L_{rec}$ denotes the reconstruction loss function, $\theta_D$ represents parameters of the decoder, and $p_D$ is a conditional probability that the decoder generates a message given a type vector and a message encoding. The first term in the sum will produce a small value when the auto-encoder has a high probability of the output matching the input for unsuitable messages, and the second term in the sum will produce a small value when the auto-encoder has a high probability of the output matching the input for suitable messages.

The two loss functions may be combined into an overall loss function as follows:

$$L(\theta_E, \theta_D, \theta_A) = \min_{\theta_E, \theta_D} \max_{\theta_A} (L_{rec}(\theta_E, \theta_D) - \lambda L_{adv}(\theta_E, \theta_A))$$

where $\lambda$ is a hyper parameter. The models resulting from optimizing this loss function allow the encoder to process an unsuitable message and generate a corresponding suitable message even though model was not trained with any parallel message pairs.

Any appropriate training techniques may be used to determine the model parameters from the training data, such as performing stochastic gradient descent using the loss function. After training, system 701 may be used to process an unsuitable message to generate a suitable message. An encoding neural network or decoding neural network that has been trained by any of the techniques described herein may be referenced as a trained network.

Implementation

Figure 8:
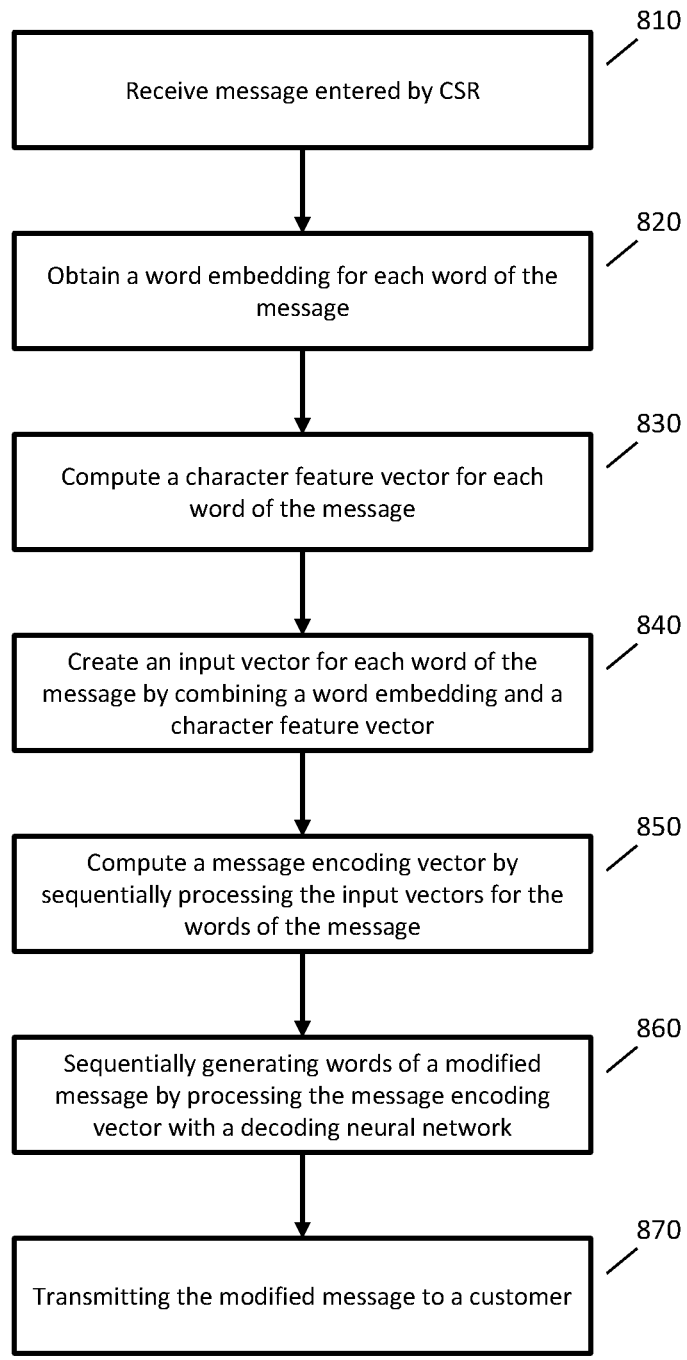
FIG. 8 is a flowchart of an example implementation of sequentially generating a modified message.

FIG. 8 is a flowchart illustrating an example implementation of modifying a message from a CSR to maintain a quality level. In FIG. 8 and other flowcharts herein, the ordering of the steps is exemplary and other orders are possible, not all steps are required, steps may be combined (in whole or part) or sub-divided and, in some implementations, some steps may be omitted or other steps may be added. The process described in any flowcharts throughout the present disclosure may be implemented, for example, by any of the computers or systems described herein At step 810, a message entered by a CSR is received. A CSR may enter the message using any appropriate techniques, such as by typing or dictating a message on any type of computing device. This message may be referred to as an input message.

At step 820, a word embedding is obtained for each word of the message entered by the CSR. Any appropriate word embeddings may be used, such as any of the word embeddings described herein. For example, word embeddings may be computed in advance and a word embedding may be retrieved from a data store corresponding to each word of the message.

At step 830, a character feature vector is computed for each word of the message entered by the CSR. Any appropriate character feature vector may be used, such as any of the character feature vectors described herein. In some implementations, a character feature vector for a word may be computed from a representation of each character of the word, such as a character embedding or a one-hot vector. The character feature vector may be computed by processing the character representations with a character neural network. A character neural network may include any appropriate neural networks, such one or more of a convolutional layer and a highway layer.

At step 840, an input vector is created for each word of the message by combining the word embedding of a word with the character feature vector of the word. Any appropriate techniques may be used for the combination, such as creating the input vector for a word by concatenating the word embedding for the word and the character feature vector for the word. In some implementations, the input vector may be created using only the word embedding or only the character feature vector.

At step 850, a message encoding vector is computed for the word by sequentially processing the input vectors for the words of the message with an encoding neural network. Any appropriate techniques may be used for computing the message encoding vector, such as any of the techniques described herein. For example, the encoding neural network may be a recurrent neural network or a bidirectional neural network that was trained using supervised techniques, semi-supervised techniques, or unsupervised techniques.

In some implementations, the encoding neural network may process the input vector for the first word of the message to generate a first state vector (and possibly a first output vector). The encoding neural network may then process the input vector for the second word and the first state vector to generate a second state vector (and possibly a second output vector). After processing all of the input vectors for the words of the message, the encoding neural network may output a final state vector (and possibly a final output vector). The message encoding vector may correspond to the final state vector (or output vector).

In some implementations, the encoding neural network may again process the words of the message in the reverse order, and the encoding neural network may generate a first final state vector (and possibly a first final output vector) for the forward processing and a second final state vector (and possibly a second final output vector) for the backward processing. The message encoding may correspond to a concatenation of the first final state vector and the second final state vector (or output vectors).

In some implementations, encoding neural network may additionally process a type vector that indicates that the encoding neural network is processing an unsuitable message.

At step 860, a modified message is generated using the message encoding vector. The modified message may be generated by sequentially generating the words of the modified message with a decoding neural network. Any appropriate techniques may be used for generating the modified message, such as any of the techniques described herein. For example, the decoding neural network may be a recurrent neural network that was trained using supervised techniques, semi-supervised techniques, or unsupervised techniques.

In some implementations, a decoding neural network may process the message encoding vector and special start token to generate a first state vector and a first output vector. The first output vector may be the length of the vocabulary of words, and the values of the first output vector may be scores or probabilities for selecting a first word of a generated message. One or more first words may be selected as candidates for starting the modified message. For each first word, decoding neural network may process an embedding of the first word and the first state vector to generate a second state vector and a second output vector. The values of the second output vector may be used to select one or more second words to follow a first word. This process may proceed using a search process, such as a beam search, to generate a tree or graph of possible modified messages, and a highest scoring message from the graph may be selected as the modified message.

In some implementations, decoding neural network may additionally process state vectors of the encoding neural network, and an output of the decoding neural network may be used to compute an attention distribution over the words of the input message and/or a probability for selecting a word from the vocabulary versus selecting a word from the input message. In some implementations, decoding neural network may additionally process a type vector that indicates that the decoding neural network is to generate a suitable message. In some implementations, an output of the decoding neural network may be used to compute a vocabulary distribution, such as the vocabulary distribution computed by vocabulary distribution computation component 535 or the vocabulary distribution computed by final distribution computation component 545.

At step 870, the generated modified message is provided to a customer, such as by transmitting the message to a device of the customer. In some instances or implementations, the modified message may be the same as the input message (e.g., where the input message was already a suitable message) or may be different from the input message.

Figure 9:
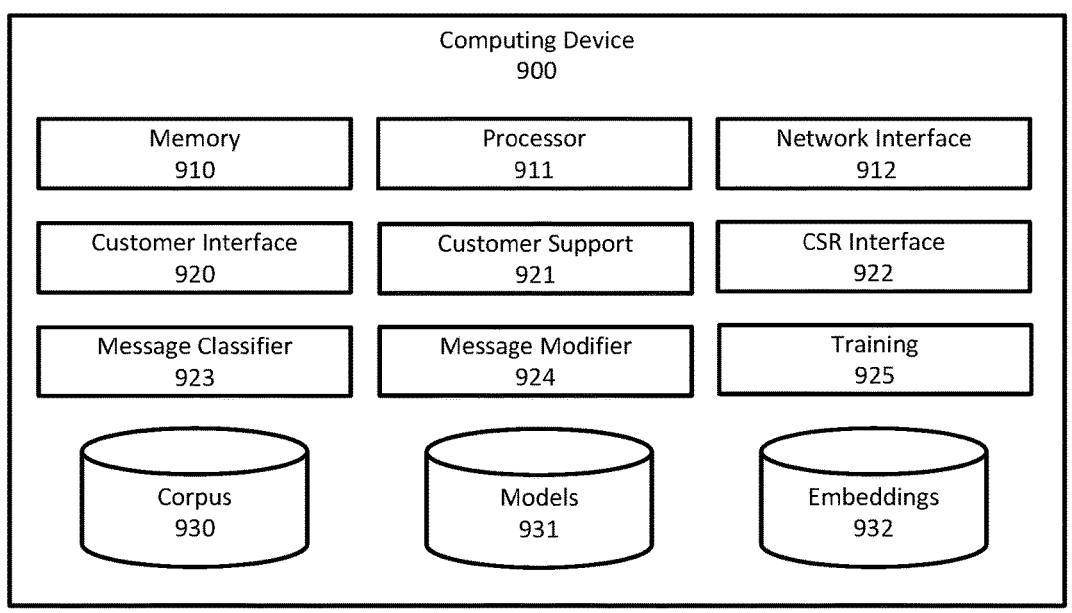
FIG. 9 is an exemplary computing device that may be used to modify a message to maintain a desired quality level.

FIG. 9 illustrates components of one implementation of a computing device 900 for implementing any of the techniques described above. In FIG. 9, the components are shown as being on a single computing device 900, but the components may be distributed among multiple computing devices, such as a system of computing devices, including, for example, an end-user computing device (e.g., a smart phone or a tablet) and/or a server computing device (e.g., cloud computing).

Computing device 900 may include any components typical of a computing device, such as volatile or nonvolatile memory 910, one or more processors 911, and one or more network interfaces 912. Computing device 900 may also include any input and output components, such as displays, keyboards, and touch screens. Computing device 900 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 900 may have a customer interface component 920 that may receive data from a customer device and transmit data to a customer device. Computing device 900 may have a customer support component 921 that may facilitate customer support sessions between a customer and a CSR. Computing device 900 may have a CSR interface component 922 that may receive data from a CSR device and transmit data to a CSR device. Computing device 900 may have a message classifier component 923 that may classify a message to determine whether the message is suitable or unsuitable using any of the techniques described herein. Computing device 900 may have a message modifier component 924 that may process an input message from a CSR to generate an output message to be transmitted to a customer. Computing device 900 may have a training component 925 that may train any of the models described herein using a training corpus of data.

Computing device 900 may include or have access to various data stores, such as data stores 930, 931, 932, and 933. Data stores may use any known storage technology such as files or relational or non-relational databases. For example, computing device 900 may have corpus data store 930 to store a training corpus that may be used to train the models described herein. Computing device 900 may have a models data store 931 that may store any of the models described herein. Computing device 900 may have embeddings data store 932 that may store any relevant embeddings, such as word embeddings, character embeddings, or word-character embeddings.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for modifying a customer service message, the method comprising:
 receiving words of an input message from a customer service representative, the input message comprising a message for a customer;
 obtaining a word embedding vector for each of the words of the input message, wherein a word embedding vector represents a corresponding word of the input message in a vector space;
 computing a character feature vector for each of the words of the input message, wherein a first character feature vector for a first word is computed by:
  obtaining a representation of each character of the first word, and
  sequentially processing the representations of the characters of the first word with a character neural network;
 creating an input vector for each of the words of the input message, wherein creating a first input vector for the first word comprises combining:
  a first word embedding vector for the first word, and
  the first character feature vector for the first word;
 computing a message encoding vector by sequentially processing the input vectors for the words of the input message with an encoding neural network;
 generating a modified message with a decoding neural network, wherein generating the modified message comprises generating words of the modified message sequentially, and wherein the message encoding vector is an input to the decoding neural network; and
 transmitting the modified message to the customer as a replacement for the input message.

2. The computer-implemented method of claim 1, wherein the character neural network comprises a convolutional layer.

3. The computer-implemented method of claim 1, wherein at least one of the encoding neural network or the decoding neural network comprises a recurrent neural network.

4. The computer-implemented method of claim 1, wherein at least one of the encoding neural network or the decoding neural network comprises a long short-term memory component.

5. The computer-implemented method of claim 1, wherein generating the modified message with the decoding neural network comprises using a beam search.

6. The computer-implemented method of claim 1, wherein generating the modified message with the decoding neural network comprises, for each word of the modified message:
 computing a vocabulary distribution using a state vector of the decoding neural network; and
 selecting one or more words using the vocabulary distribution.

7. The computer-implemented method of claim 1, wherein generating the modified message with the decoding neural network comprises, for each word of the modified message, computing an attention distribution over the words of the input message.

8. A system for modifying a customer service message, the system comprising:
 at least one server computer comprising at least one processor and at least one memory, the at least one server computer configured to:
  receive words of an input message provided by a customer service representative, the input message comprising a message for a customer;
  obtain a word embedding vector for each of the words of the input message, wherein each word embedding vector represents a corresponding word in a vector space;
  compute a character feature vector for each of the words of the input message, wherein computing a first character feature vector for a first word comprises obtaining representations of individual characters of the first word and processing the representations of the individual characters of the first word with a character neural network;
  create an input vector for each of the words of the input message, wherein creating a first input vector for the first word comprises combining a first word embedding vector for the first word and the first character feature vector for the first word;
  compute a message encoding vector by sequentially processing the input vectors for the words of the input message with an encoding neural network;
  generate a modified message with a decoding neural network, wherein generating the modified message comprises generating words of the modified message sequentially, and wherein the message encoding vector is an input to the decoding neural network; and
  cause the modified message to be transmitted to the customer as a replacement for the input message.

9. The system of claim 8, wherein:
 the encoding neural network is configured to receive as input a first type vector that indicates that the input message is an unsuitable message; and
 the decoding neural network is configured to receive as input a second type vector that indicates that the modified message is to be a suitable message.

10. The system of claim 9, wherein each of the encoding neural network and the decoding neural network comprise neural networks trained using an adversarial discriminator.

11. The system of claim 9, wherein the first type vector and the second type vector were computed during training of the encoding neural network and the decoding neural network.

12. The system of claim 8, wherein the at least one server computer is configured to generate the modified message with the decoding neural network by, for each word of the modified message, computing an attention distribution over the words of the input message.

13. The system of claim 12, wherein the at least one server computer is configured to generate the modified message with the decoding neural network by, for each word of the modified message, computing a probability for selecting a word from the input message.

14. The system of claim 8, wherein each of the encoding neural network and the decoding neural network comprise neural networks trained using an auto-encoder that modifies a suitable message to an unsuitable message and then modifies the unsuitable message back to another suitable message.

15. One or more non-transitory computer-readable media comprising computer executable instructions that, when executed, cause at least one processor to perform actions comprising:
- receiving words of an input message entered by a customer service representative, the input message comprising a message for a customer;
- obtaining a word embedding vector for each of the words of the input message, wherein each word embedding vector represents a corresponding word in a vector space;
- computing a character feature vector for each of the words of the input message, wherein computing a first character feature vector for a first word comprises sequentially processing characters of the first word with a character neural network;
- creating an input vector for each of the words of the input message, wherein creating a first input vector for the first word comprises combining a first word embedding vector for the first word and the first character feature vector for the first word;
- computing a message encoding vector by sequentially processing the input vectors for the words of the input message with an encoding neural network;
- generating a modified message with a decoding neural network, wherein generating the modified message comprises generating words of the modified message sequentially, and wherein the message encoding vector is an input to the decoding neural network; and
- causing the modified message to be transmitted to the customer as a replacement for the input message.

16. The one or more non-transitory computer-readable media of claim 15, the actions comprising processing the input message with a message classifier to determine that the input message does not meet a quality level.

17. The one or more non-transitory computer-readable media of claim 16, wherein the message classifier processes the input vectors for the words of the input message.

18. The one or more non-transitory computer-readable media of claim 16, wherein the message classifier comprises a convolutional layer and a recurrent layer.

19. The one or more non-transitory computer-readable media of claim 15, wherein the first word is an out-of-vocabulary word and the first word embedding corresponds to a token for out-of-vocabulary words.

20. The one or more non-transitory computer-readable media of claim 15, wherein generating the modified message with the decoding neural network comprises, for each word of the modified message, computing an attention distribution over the words of the input message.

21. The one or more non-transitory computer-readable media of claim 15, wherein sequentially processing the characters of the first word with the character neural network comprises sequentially processing character embeddings or one-hot vectors of the characters of the first word.

* * * * *

UNITED STATES PATENT AND TRADEMARK OFFICE
CERTIFICATE OF CORRECTION

PATENT NO. : 10,489,792 B2
APPLICATION NO. : 15/863225
DATED : November 26, 2019
INVENTOR(S) : Joseph Ellsworth Hackman et al.

It is certified that error appears in the above-identified patent and that said Letters Patent is hereby corrected as shown below:

On the Title Page

Page 4, in Column 1, Item (56) under "Other Publications", Line 10, delete ".edu~" and insert -- .edu/~ --, therefor.

Page 4, in Column 2, Item (56) under "Other Publications", Line 48, delete "forWord" and insert -- for Word --, therefor.

In the Specification

Column 18, Line 49, delete "herein" and insert -- herein. --, therefor.

Signed and Sealed this
Twenty-sixth Day of May, 2020

Andrei Iancu
*Director of the United States Patent and Trademark Office*